US005555279A

United States Patent [19]
Nir et al.

[11] Patent Number: 5,555,279
[45] Date of Patent: Sep. 10, 1996

[54] SYSTEM FOR MONITORING AND CONTROLLING NUCLEAR REACTORS

[76] Inventors: Israel Nir, 1755 Plantation Blvd., Jackson, Miss. 39211; Christofer M. Mowry, 445 Wexford Overlook Dr., Roswell, Ga. 30075

[21] Appl. No.: 340,586

[22] Filed: Nov. 16, 1994

[51] Int. Cl.[6] .................................. G21C 7/36
[52] U.S. Cl. .................. 376/216; 376/254; 376/241; 376/215
[58] Field of Search .................. 376/216, 254, 376/241, 215; 926/DIG. 301; 340/822.65

[56] References Cited

U.S. PATENT DOCUMENTS

| | | | |
|---|---|---|---|
| 3,565,760 | 2/1971 | Parkos | 176/24 |
| 3,873,817 | 3/1975 | Liang | 235/151.21 |
| 3,998,693 | 12/1976 | Musick | 176/20 R |
| 4,069,097 | 1/1978 | Frank | 176/22 |
| 4,080,251 | 3/1978 | Musick | 176/24 |
| 4,108,720 | 8/1978 | Sato et al. | 176/20 R |
| 4,133,039 | 1/1979 | Eichenlaub | 364/554 |
| 4,292,129 | 9/1981 | Barry | 176/24 |
| 4,319,959 | 3/1982 | Monta et al. | 376/245 |
| 4,582,672 | 4/1986 | Tuley, Jr. et al. | 376/254 |
| 4,627,954 | 12/1986 | Leroy et al. | 376/216 |
| 4,637,910 | 1/1987 | Impink, Jr. | 376/216 |
| 4,642,213 | 2/1987 | Impink, Jr. | 376/218 |
| 4,770,843 | 9/1988 | Taleyarkhan | 376/216 |
| 4,783,307 | 11/1988 | Galligan et al. | 376/217 |
| 4,876,057 | 10/1989 | Bernard et al. | 376/216 |
| 4,975,239 | 12/1990 | O'Neil et al. | 376/247 |
| 5,024,801 | 6/1991 | Impink, Jr. et al. | 376/217 |
| 5,091,139 | 2/1992 | Chao et al. | 376/216 |
| 5,112,565 | 5/1992 | Ball et al. | 376/216 |
| 5,141,710 | 8/1992 | Stirn et al. | 376/254 |
| 5,174,946 | 12/1992 | Watford et al. | 376/216 |
| 5,225,149 | 7/1993 | Banda | 376/255 |
| 5,406,598 | 4/1995 | Takeuchi et al. | 376/254 |

*Primary Examiner*—Donald P. Walsh
*Assistant Examiner*—Meena Chelliah
*Attorney, Agent, or Firm*—Paul & Paul

[57] ABSTRACT

A computer-based power oscillation detection system and method for detecting, monitoring and indicating thermal-hydraulic stability margin in a nuclear reactor is provided. A group of neutron flux detectors is distributed throughout the reactor core, in contiguous relation to the reactor fuel assemblies, with each flux detector providing an output signal indicative of the power density of the portion of the core adjacent to the detector. A computer-based system processes the detector output signals utilizing a period based algorithm that employs an oscillation detection counting function wherein a count corresponding to the level of periodicity of the signal is determined. Since a representative oscillation count for each reactor stability state usually only occurs on the order of several minutes for a single detector signal, a unique simulated decay ratio algorithm reduces the time required to obtain a representative count by processing the group of detector signals spread throughout the core. The highest count for any detector in the group is utilized by the simulated decay ratio algorithm to provide a simulated decay ratio signal that corresponds to the reactor thermal-hydraulic stability. To overcome statistical variations in successive oscillation period counts, a spike rejection function and a smoothing function may be employed to provide improved simulated decay ratio signal performance. A corrective signal issues when the simulated decay ratio signal reaches a predetermined level which may be used to take corrective action, activate an alarm, provide a visual indication of decay ratio, or to initiate an automatic reactor suppression function.

36 Claims, 13 Drawing Sheets

SDR SYSTEM HARDWARE FLOW DIAGRAM

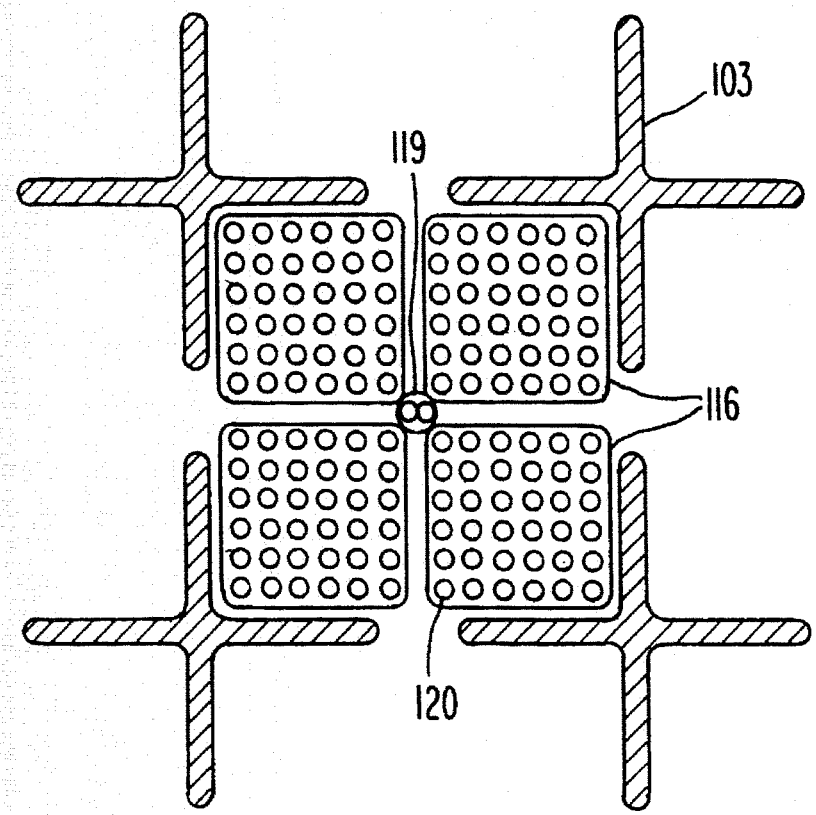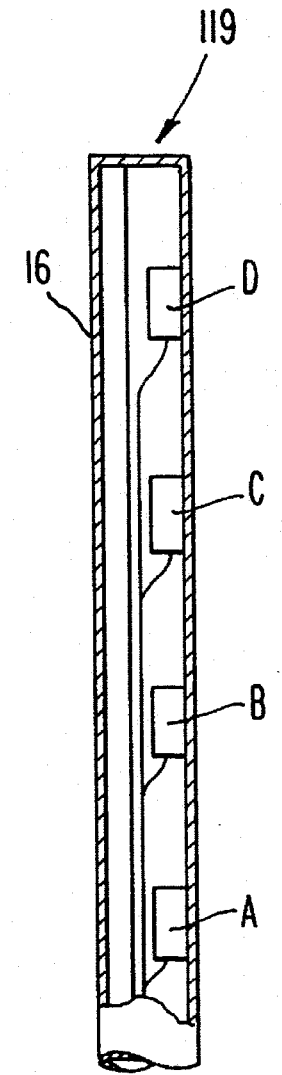
*Fig. 3*
*Fig. 4*

SYSTEM FOR MONITORING AND CONTROLLING NUCLEAR REACTORS

BACKGROUND OF THE INVENTION

In presently known nuclear reactors, particularly in boiling water reactors, the reactor core typically contains a plurality of vertically oriented fuel assemblies arranged in an array such that a self-sustaining nuclear fission reaction can be controlled. The typical core is generally contained in a pressure vessel and submerged in a liquid such as water. The water may serve as both a core coolant and a neutron moderator. A series of vertically oriented, moveable control rods, composed of neutron absorbing material, are insertable between the fuel assemblies such that core reactivity control may be accomplished by adjusting the control rods within the core. In the usual case, water flows through channels located amongst the fuel rods and control rods in the core and is pumped upwardly from a lower plenum below the core to an upper plenum above the core.

To monitor the power distribution within the core, it is common practice to place in-core neutron detectors both radially and axially throughout the core. The signals from these neutron detectors are used to monitor core conditions and to initiate action in the event of a detected abnormality in the reactor. Core monitoring may include providing a reactor operator with analog or digital indications of the monitored conditions and providing an alarm when an abnormal condition is detected. Action, such as shutdown of the reactor, may also be automatically initiated when an abnormal core condition is detected.

A boiling water reactor is capable of entering a state called thermal-hydraulic instability that can challenge established fuel thermal and mechanical safety limits. Examination of the thermal-hydraulic stability of a reactor must be performed to prevent potential damage to the core. Thermal-hydraulic instability may be described as follows. Pressure perturbations at the core inlet cause flow disturbances that travel up the fuel channels as time-varying density waves. These waves result in local deviations from the steady-state axial pressure drop distribution. The local pressure drop in a fuel assembly is highly dependent on void fraction. Since the coolant voiding increases axially with greater core elevation, the highest void fraction is found at the channel outlet.

The effect of density waves on the total channel pressure drop is therefore effectively delayed in time—the void sweeping time—until the perturbation is felt at the channel exit. When the channel pressure drop time delay (phase lag) nears 180 degrees out of phase with the channel inlet flow variations, the fuel assembly can become thermal-hydraulically unstable. Thus, the thermal-hydraulic stability margin of a fuel channel is dependent on the phase lag caused by void sweeping time, and the gain which is dependent on the channel void distribution.

An additional complexity is introduced in boiling water reactor stability because of the reactor power dependency on coolant density. Local void reactivity responds to the time-varying density wave described above. The reactivity change affects local neutron flux and is manifested after a time delay as changes in fuel cladding surface heat flux and ultimately in local coolant voiding. This mechanism can also provide positive feedback to density wave oscillations. The neutronic feedback gain is dependent on how closely the fuel thermal time constant approximates the void sweeping time, and on the local void fraction.

The two feedback mechanisms, thermal hydraulic and neutronic, are coupled in a boiling water reactor core and produce oscillations in both core flow and thermal power. These oscillations can affect margins to fuel safety limits. In addition, core instabilities can occur even when neither feedback mechanism alone is sufficient to generate power oscillations.

Generally, existing thermal-hydraulic instability detection systems do not have the means to rapidly and accurately notify an operator of the core's stability margin. In the current invention, a simulated decay ratio signal is generated that relates to the thermal-hydraulic stability of a nuclear reactor which is input into means to take corrective action, notify an operator, or initiate an automatic suppression function upon reaching a minimum specified stability margin. A computer-based system is used, utilizing algorithms that provide a fast system response time such that a reliable indication of reductions in thermal-hydraulic stability of a core may be obtained prior to the core actually becoming unstable, and so that reactor operators may have sufficient time to take compensatory measures, or an automatic suppression function may be initiated.

SUMMARY OF THE INVENTION

A power oscillation detection system and method for monitoring thermal hydraulic stability in a nuclear reactor core which indicates to nuclear plant operators the reactor stability margin, or generates automatic initiation of corrective action when instabilities occur, is provided.

In a preferred embodiment, the system contains a plurality of in-core neutron flux detectors spatially distributed throughout the reactor core. Each flux detector provides an output signal. A band-pass filter removes high frequency components of the output signals that are in excess of the characteristic frequency range for thermal-hydraulic instability. A computer-based signal processor system employing a period based algorithm utilizes a counting means that evaluates the output signal of each flux detector to determine a time-dependent count for each flux detector output signal corresponding to consecutive flux detector signal oscillations with periods that are within a given time tolerance and range. This count correlates to the thermal-hydraulic stability of the reactor. A representative maximum oscillation period count for a given reactor stability state is desired to be used to determine a decay ratio, however, that count generally occurs only once every several minutes for each individual flux detector signal. To create a faster response time, the present invention utilizes a computer-based signal processor system using a simulated decay ratio algorithm that employs a count combining means for determining the maximum oscillation period count of a designated group of flux detectors that are spatially distributed throughout the reactor core, over a substantially shorter evaluation time. This evaluation time may be dynamically established utilizing real-time processed data from the in-core flux detectors. Utilizing this computer-based system, the decay ratio may be updated, for example, approximately every five seconds.

To overcome expected statistical variations in the maximum oscillation period count between the consecutive evaluation periods, the signal processor that processes the simulated decay ratio signal may employ several techniques to provide improved performance. First, a spike rejection function may be used to reduce anomalous changes in the combined oscillation period count value that are not related to actual core performance. Second, the maximum combined oscillation period count for several evaluation periods may be processed to develop a consistent and responsive measure of the core stability performance. Finally, the processed maximum oscillation period count is used to establish the simulated decay ratio signal. This simulated decay ratio signal provides an estimate of the nuclear power reactor core decay ratio that is representative of the reactor's thermal-hydraulic stability margin. This representative decay ratio signal may then be used as input to an indicating device such that a reactor operator can monitor core conditions, to generate an alarm at a desired simulated decay ratio level, or, to generate an automatic reactor trip signal at a desired simulated decay ratio level.

It is accordingly an object of the present invention to provide a computer-based oscillation detection system for monitoring and indicating thermal-hydraulic stability margin in a nuclear reactor.

A further object of the present invention is to provide a computer-based oscillation detection system for monitoring and indicating unacceptable losses in thermal-hydraulic stability margin that, if unmitigated, are capable of inducing sustained oscillations of a character potentially damaging to the reactor core.

Another object of the current invention is to provide a computer-based oscillation detection system for monitoring and indicating thermal-hydraulic stability margin wherein neutron flux is monitored at axial and radially distributed locations throughout the reactor core to detect and indicate changes in thermal-hydraulic stability margin.

A further object of the present invention is to provide a computer-based oscillation detection system for monitoring and indicating thermal-hydraulic stability margin, wherein reactor personnel are notified in the event of the transition to thermal-hydraulic instability induced flux oscillations.

Another object of the present invention is to provide a computer-based oscillation detection system for monitoring and indicating thermal-hydraulic stability margin, having a fast response time, wherein corrective controls are instituted in the event of changes in stability margin.

Another object is to provide a computer-based oscillation detection system for monitoring and indicating of thermal-hydraulic stability margin, having a fast response time, wherein an automatic suppression function is initiated in response to the detection of a specified reactor stability state.

Other objects and advantages of the present invention will become apparent from the following description taken in conjunction with the accompanying drawings.

BRIEF DESCRIPTION OF THE DRAWINGS

FIG. 2b is an overall plan view of a nuclear reactor fuel core as employed in the reactor of FIG. 1, illustrating the full cross-sectional view of the core detailed in FIG. 2a.

FIG. 3 is a transverse sectional view of four typical adjacent fuel assemblies with a corresponding in-core flux detector string and control rods as employed in the reactor of FIG. 1.

FIG. 4 is an longitudinal sectional view, partially broken away, of an in-core flux detector string utilized in the reactor of FIG. 1.

DESCRIPTION OF THE PREFERRED EMBODIMENT

The present invention provides a computer-based oscillation detection system for monitoring and indicating changes in the thermal hydraulic stability margin of a nuclear reactor core. In the preferred embodiment of the present invention, the oscillation detection system examines neutron flux signals at axial and radially distributed locations throughout the reactor core and a signal processor analyzes this data to provide a simulated decay ratio signal as output that is related to the reactor core's thermal-hydraulic stability margin. A digital or analog monitor for displaying the current simulated decay ratio to an operator may be provided. Additionally, issuance of a low stability margin signal may be provided wherein an alarm to alert reactor personnel may be issued. Furthermore, issuance of an oscillation suppression signal may be provided wherein the oscillation suppression signal may initiate a function such as automatic shutdown of the reactor upon the simulated decay ratio signal reaching certain predefined levels indicating the transition to instability. Any suitable computer with appropriate interfacing for inputting the flux density signals may be employed in the practice of this invention. Additionally, electronic arithmetic logic circuits may be used to perform each of the desired functions.

Figure 1:
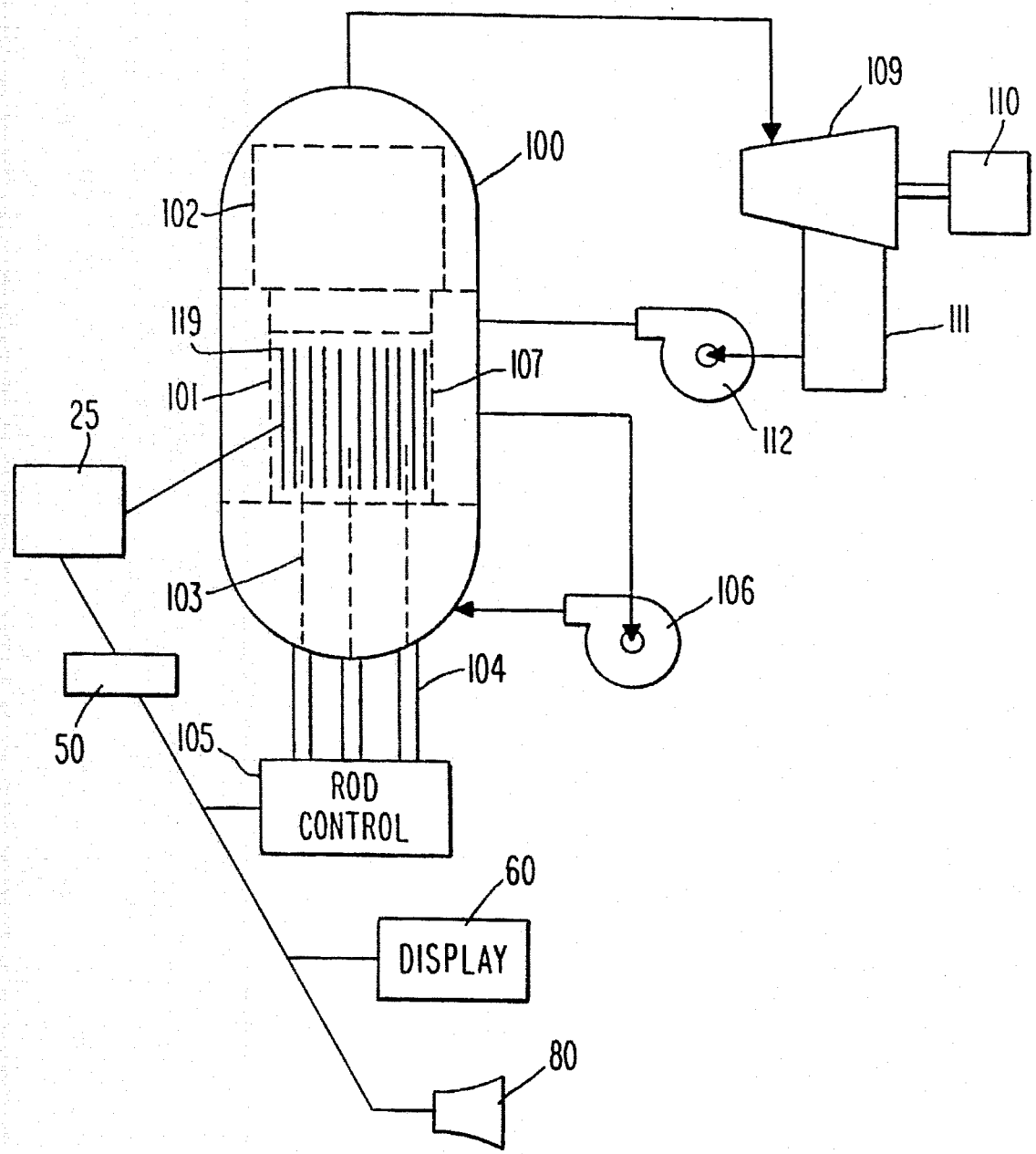
FIG. 1 is a schematic diagram of a boiling water nuclear reactor power plant as applicable to the present invention.

Although not limited thereto, the invention is described herein as applied to a boiling water nuclear reactor. Referring now in detail to the drawings, wherein like reference numerals indicate like elements throughout the figures, there is shown in FIG. 1 a typical boiling reactor which contains a pressure vessel 100, a core of nuclear fuel rods 101 and a steam separating and drying apparatus 102. The pressure vessel 100 is filled with a coolant to a level above the core 101. The coolant is circulated through the core 101 by a circulation pump 106 which forces the coolant upward through the fuel assemblies 116 of the reactor core 101 (see FIGS. 2a and 3). The heat produced by the nuclear reaction of the fuel is transferred to the coolant such that steam is collected in the upper portion of the reactor pressure vessel 100. The steam is applied to a turbine 109 which drives an electrical generator 110. The turbine exhausts to a condenser 111 and the resulting condensate is returned as feed water to the pressure vessel 100 by a feed water pump 112.

Figure 2A:
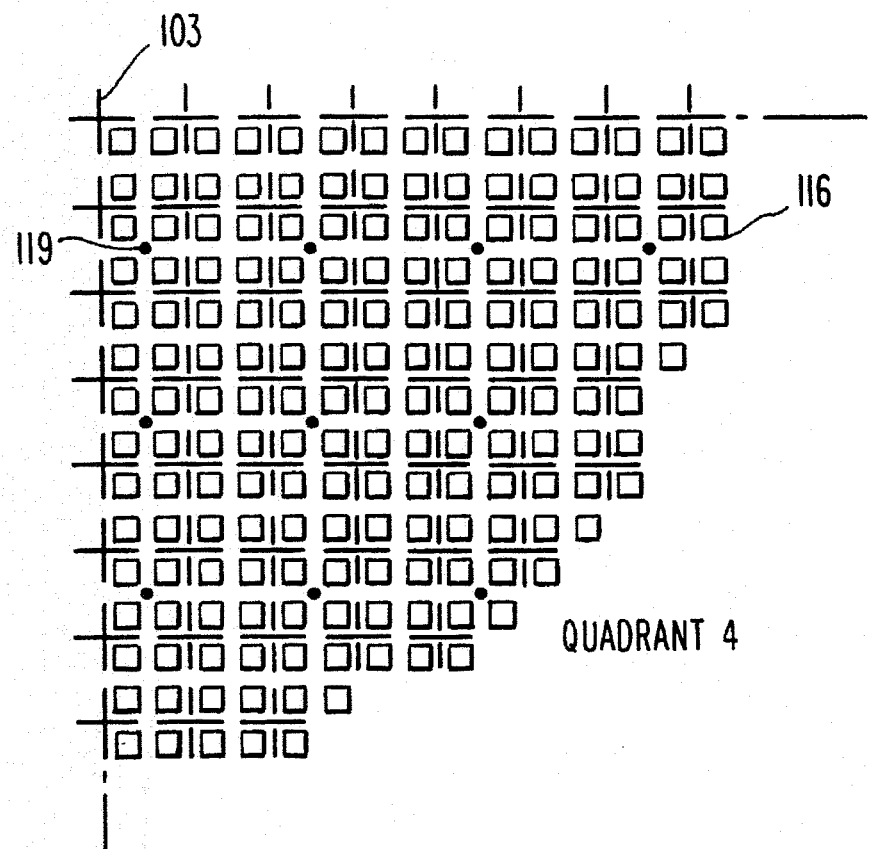
FIG. 2a is a simplified, representative cross-sectional plan view of one quarter of a nuclear fuel core as employed in the reactor of FIG. 1.

A plurality of control rods 103, as shown in FIGS. 1, 2a and 3, which may be driven axially into and out of the core 101 between nuclear fuel rods by a drive device 104 are used as a means to control the reactivity of the core 101. Typically, the nuclear fuel is provided as elongated rods with a cladding of corrosion resistant, non-reactive material. The fuel rods are grouped at fixed distances from each other in the coolant flow channel as a fuel assembly 116. A sufficient number of fuel assemblies 116 are arranged in a spaced array such that the nuclear reactor core 101 is formed that is capable of a self-sustained nuclear reaction. Sufficient space is provided between the fuel rods to allow clearance for control rods 103 and monitoring devices (see below). A rod control system 105 controls the drive devices 104.

Figure 2B:
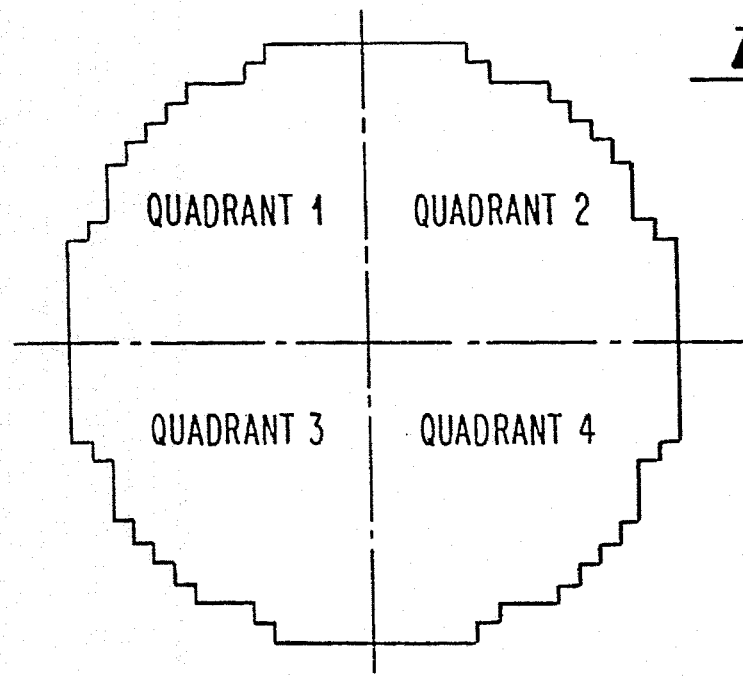

A typical fuel assembly 116 is formed by, as an example, an eight by eight array of closely spaced fuel rods (see FIG. 3 which shows a six by six array), the fuel rods being, for example, circular in cross section, twelve feet in length, and approximately one-half inch in diameter. One quadrant of a typical nuclear reactor core 101 is illustrated in schematic plan view in FIG. 2a. The full core 101 comprises four similar quadrant portions arranged as shown in FIG. 2b.

The present invention utilizes a signal processor 25 that provides a simulated decay ratio signal which correlates to the thermal-hydraulic stability of the reactor core. A decay ratio of a value of one indicates the onset of instability, with increasing values above one indicating increased instability, and decreasing values below one indicating increased stability. The simulated decay ratio signal provides continuous indication of thermal-hydraulic stability margin which the signal processor 25 provides as a signal to a control system which notifies reactor operators of the reactor stability margin by use of an alarm or visual display. For example, the alarm 80 may be activated to alert reactor personnel of oncoming unacceptable losses in stability margin upon the decay ratio reaching a level between 0.5 and 1.0, for example, at approximately 0.7. Additionally, or alternatively, the signal may be used as input to a reactor control system wherein an automatic oscillation suppression function is initiated in response to the desired simulated decay ratio signal level. This automatic oscillation suppression function may include a suppression function for suppression of oscillations by control of coolant flow, by repositioning control rods 103, or other like function. For example, a rod blocking signal received from the reactor control system could inhibit further withdrawal of the control rods 103. A SCRAM signal received from the reactor control system could cause rapid insertion of all control rods 103 and thus reactor shut-down.

The stability related neutron flux oscillations in boiling water reactors exhibit a signal with a dominant frequency generally in the range of 0.3 to 0.7 Hertz, however, sustained oscillations are generally not present during normal, stable operations of the reactor. As the stability margin is lost and the stability threshold is crossed, sustained oscillations develop and begin to grow with a constant oscillation period. The characteristics of the oscillations are determined by the reactor conditions, how rapidly the condition is entered, and also by perturbations in the system. In general, the approach to the instability threshold in the range of interest (0.3 to 0.7 Hz) is relatively gradual. These characteristics allow systems to be designed that are capable of discriminating between stability-related neutron flux oscillations and other expected neutron flux oscillations, such that early detection of thermal-hydraulic instability is possible, prior to the instability actually occurring.

Figure 6:
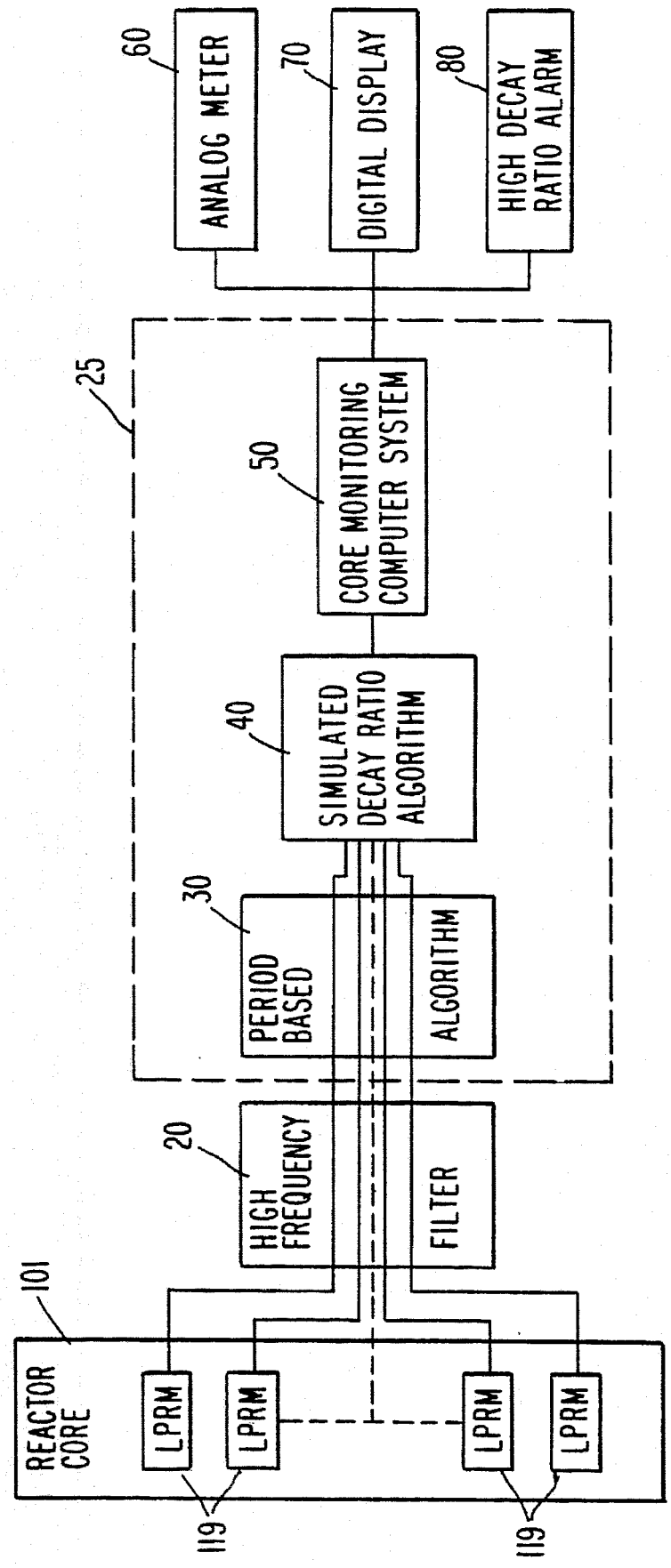
FIG. 6 is a block diagram of a computer-based oscillation detection system architecture for monitoring and controlling a nuclear power plant of FIG. 1, constructed in accordance with the present invention.
Figure 7:
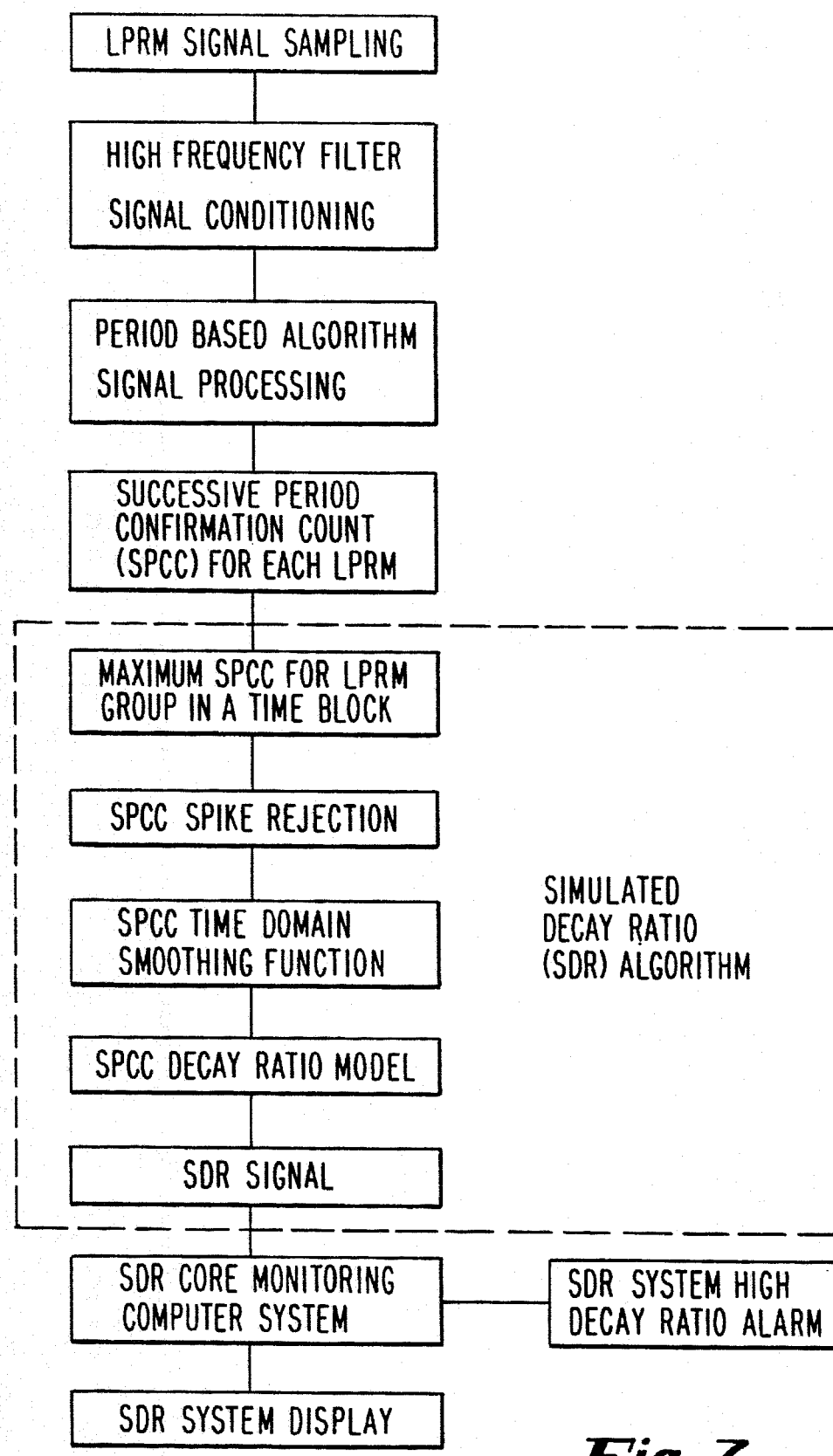
FIG. 7 is a block diagram of the computer-based oscillation detection system architecture for monitoring and controlling a nuclear power plant using a simulated decay ratio algorithm constructed in accordance with the present invention, including a block diagram of the simulated decay ratio algorithm of the present invention.

Referring to the drawings, there is shown in FIGS. 6 and 7 block diagrams of a system for control of a nuclear power plant constructed in accordance with one preferred embodiment of the present invention. At the left side of the block diagram of FIG. 6 is a block signifying the reactor core 101 of a boiling water reactor. Within the reactor core 101, a plurality of in-core flux detector strings, such as local power range monitors (LPRM) strings 119 are present for detection of neutron flux within the core 101 as shown in FIG. 4. A portion of the fuel core 101 illustrated in FIGS. 2a and 2b, including four fuel assemblies 116 positioned between four control rods 103, is shown enlarged in FIG. 3 with the fuel rods and the in-core flux detector strings 119 positioned between four control rods 103.

Each in-core flux detector string 119 includes a hollow tube 16 typically containing four spaced neutron detectors, A, B, C, D, as seen in FIG. 4. The tubes 16 are vertically oriented between the fuel assemblies 116 in the reactor core 101, in coextensive relation with the length of the active fuel portion of the fuel rods thereof, such that the neutron detectors A, B, C, D can monitor local power distribution at four distinct axial regions of each of the in-core flux detector string 119 locations radially distributed throughout the core 101. For example, in a reactor core 101 that is twelve feet long in the axial direction, the four neutron detectors, A, B, C, and D would be spaced approximately 2 to 3 feet apart.

Figure 5:
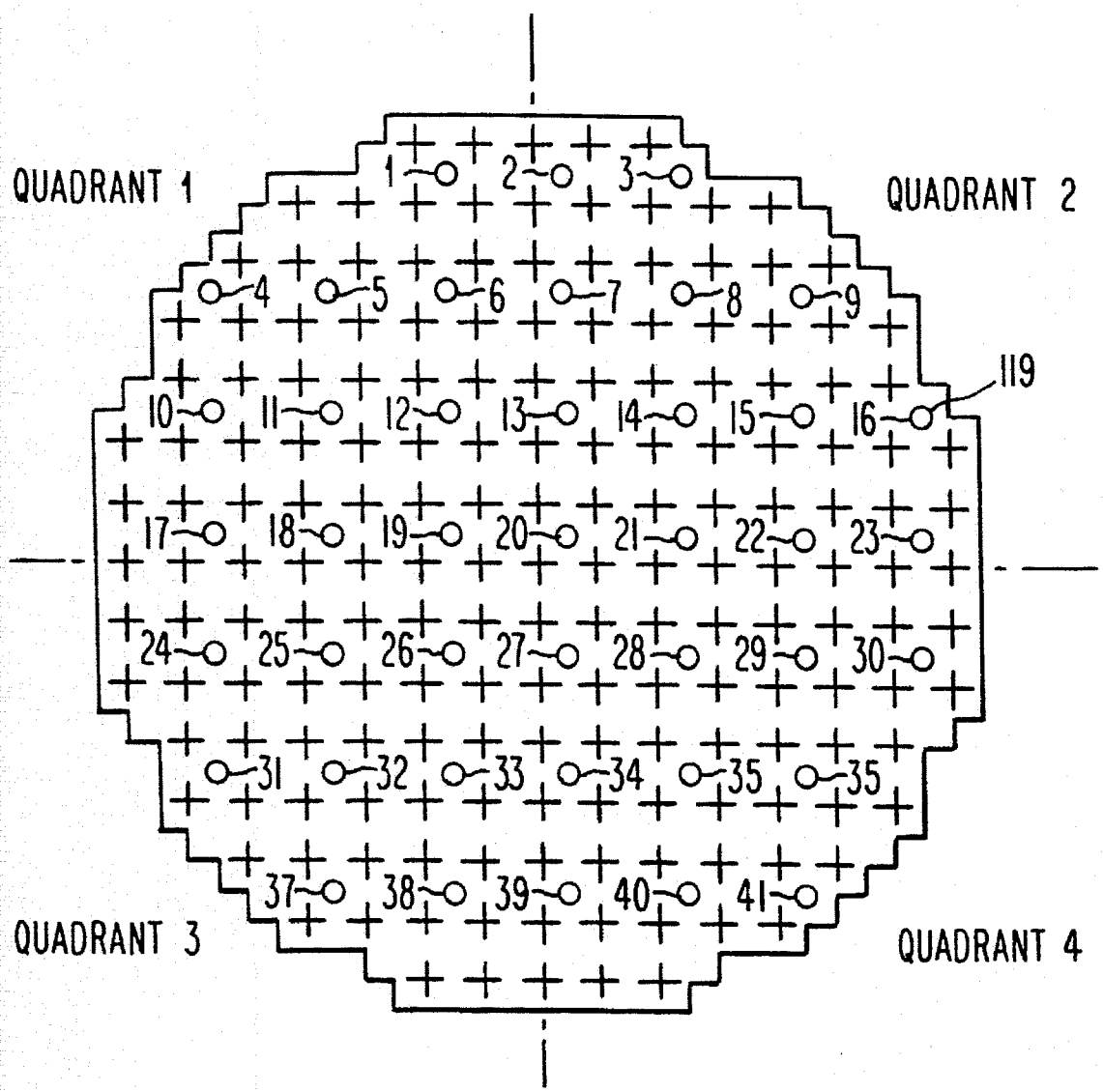
FIG. 5 is a simplified cross-sectional plan view of a large nuclear reactor core illustrating the core-wide distribution of in-core flux detector strings of the present invention.

A typical distribution of in-core flux detector strings 119 throughout a nuclear reactor core 101 is illustrated in FIG. 5 wherein the in-core flux detector strings 119 are numbered 1–41. For clarity of illustration, the fuel assemblies 116 are not illustrated and only the control rods 103 and in-core flux detector string 119 patterns are shown. Substantially complete monitoring of the core 101 is provided.

From the foregoing, it is seen that the nuclear detectors A, B, C, D are distributed radially in in-core flux detector strings 119 and each string includes four in-core flux detectors A–D distributed axially along the string. Each in-core flux detector A, B, C, D in a string 119 produces an output signal corresponding to neutron flux detected.

The in-core detector signals may be divided into one or more groups for processing. For example, each of 164 in-core flux detector signals in FIG. 5 (from in-core flux detector 1A–1D through 41A–41D) is applied to a circuit or software means that divides the 164 in-core flux detector signals into, for example, 8 groups. Thus, in this instance, each group of in-core flux detectors signals contains approximately 20 in-core flux detectors signals. These 20 in-core flux detector signals are from in-core flux detectors spaced throughout the core 101. The signals from the detectors in each group are then processed independently and simultaneously.

As can be seen in the block diagrams of FIGS. 6 and 7, the output signal of each in-core flux detector A, B, C, D may be next input into a high frequency filter 20. The input signal is filtered (referred to as the "conditioning" filter) to remove a select portion of the noise components with frequencies above the range of interest. Typically, this is accomplished with a filter with a corner frequency of 1.5 to 2.5 Hz. Since the oscillation period of boiling water reactor density wave instabilities is well known and relatively constant, i.e. a frequency range of 0.3 to 0.7 Hz, most neutron flux signal frequencies above 0.7 Hz are filtered since they could interfere with the system's ability to discriminate neutron flux perturbations related to thermal-hydraulic stability. The order or number of poles used in the conditioning filter determines how rapidly the gain falls off beyond the corner frequency. When combined with the corner frequency, the desired frequency effect can be controlled. Testing has demonstrated that a two-pole filter is sufficient for the objective of the filter.

Figure 8:
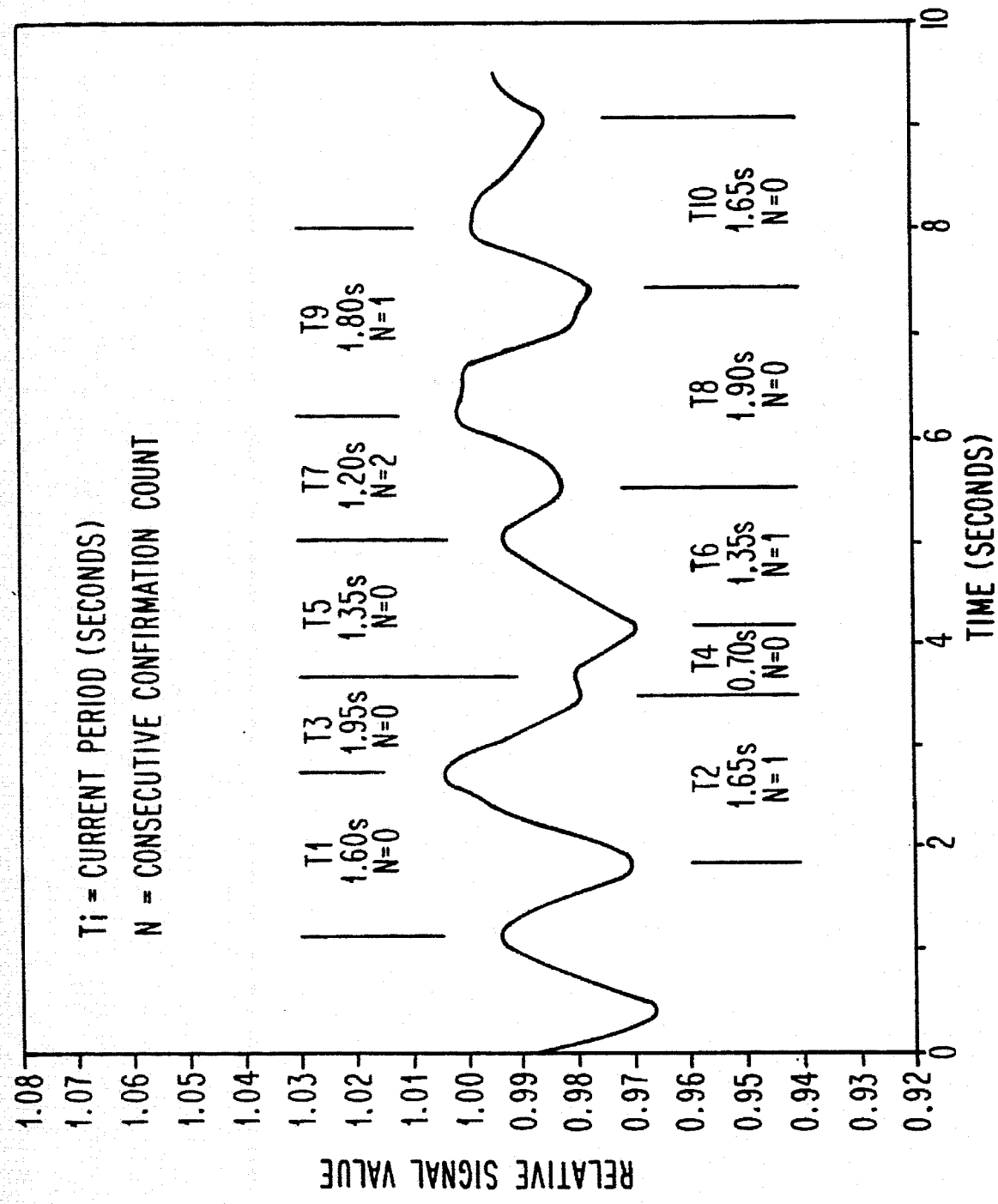
FIG. 8 is a time domain representation of a typical in-core flux detector output signal of the computer-based oscillation detection system for monitoring and indicating of thermal-hydraulic stability margins of the present invention.

FIG. 8 illustrates a typical relative output signal of an individual in-core flux detector relative to time in seconds.

PERIOD-BASED DETECTION SIGNAL

Each in-core flux detector output signal is interrogated at small time intervals called sample time steps by a signal processing computer utilizing a period based algorithm to evaluate the periodicity of the signal, i.e., for the presence of density waves in the reactor core. This level of periodicity will later be correlated with the thermal-hydraulic stability of the reactor core. The rate at which the in-core flux detector signals are sampled by the algorithm is important in determining the ability of the system to recognize instabilities. Sufficient resolution of a flux detector signal oscillation cycle is needed to determine its periodicity. For the range of expected oscillation periods, typical values of the sample time step are in the range of approximately 50 to 100 milliseconds. Values greater than 100 milliseconds will give yield less satisfactory results. Values below 50 milliseconds will also give satisfactory results, but sampling at this faster level is not required. The period based algorithm establishes a successive oscillation period confirmation count for each in-core flux detector, as will be explained in detail below.

Instead of looking at the relative signal value amplitude as is often the case when analyzing data from in-core flux detector signals, the period based algorithm examines each in-core flux detector output signal to determine periodicity data based on the oscillation period, i.e., the time between successive peaks and successive minima in the signal (T1 through T10 in FIG. 8).

The first period detected within the expected range is defined as the base period, $T_o$ (T1 in FIG. 8). The next period calculated (either based on two successive peaks or minima, depending on whether the base period was from two successive minima or peaks) is then compared to the base period to determine if oscillatory behavior is present. As shown in FIG. 8, the next period, T2 is within 50 milliseconds of the base period.

A nuclear power reactor core decay ratio provides a measure of the reactor's thermal-hydraulic stability. As the decay ratio of the reactor increases, the likelihood that the next related oscillation period will be equal to the base period also increases. In the limit, for a reactor with a decay ratio of 1.0, each successive period is equal to the base period. For the purposes of this invention, which establishes stability margins in a stable reactor, successive periods are compared to determine if they are within a small period tolerance, $\pm\epsilon$. This period tolerance may be in the range of approximately 50 to 300 milliseconds, and preferably, about 150 milliseconds for a sample time step of 50 milliseconds. If the current period is equal to the base period, within the tolerance, then this is considered to be a "confirmation", and N is incremented by one, where N is the successive confirmation count, an example of which is illustrated in FIG. 8 by periods T1 and T2. To smooth out the effects of a finite sampling interval, a new base period is then calculated that is equal to the average of the consecutively confirmed periods. For T1 and T2 in FIG. 8, the new base period is 1.625 seconds. The process then continues as the next period is compared to the new base period. Successive confirmations result in an increase in N, the number of confirmations. A large number of successive confirmations is direct evidence that the reactor is approaching an instability.

If any of the current periods are not within the specified tolerance, $\pm\epsilon$, the confirmation count is reset to zero, and the current period is compared to the new base period. In FIG. 8, for $\epsilon=150$ milliseconds, period T3 is not close to the base period and the confirmation count is reset. T3 and T4 are also outside the expected period range and are not counted as base periods. The process then continues with the determination of the next period. In FIG. 8, T5 is selected as a new base period and periods T6 and T7 are close enough to result in two consecutive confirmations. However, period T8 is outside the allowed tolerance and the logic is reset again.

The period tolerance, $\pm\epsilon$, is used to determined if two successive periods are close enough to be considered related to the same density wave oscillation. As reactor instability is approached, the difference between successive periods decreases, and in the limit, each successive period has the same value (within the resolution of the sampling interval). If a large tolerance, $\epsilon$, is selected, the system will indicate that confirmations are occurring even when successive periods show rather large variations. If a small tolerance is selected, the system will only give a large number of successive confirmations when a distinct oscillation has developed. The period-based algorithm output signals correspond to the successive confirmation count for each in-core flux detector. These signals are input into a computer utilizing the simulated decay ratio algorithm of the present invention.

SIMULATED DECAY RATIO SIGNAL

Figure 9:
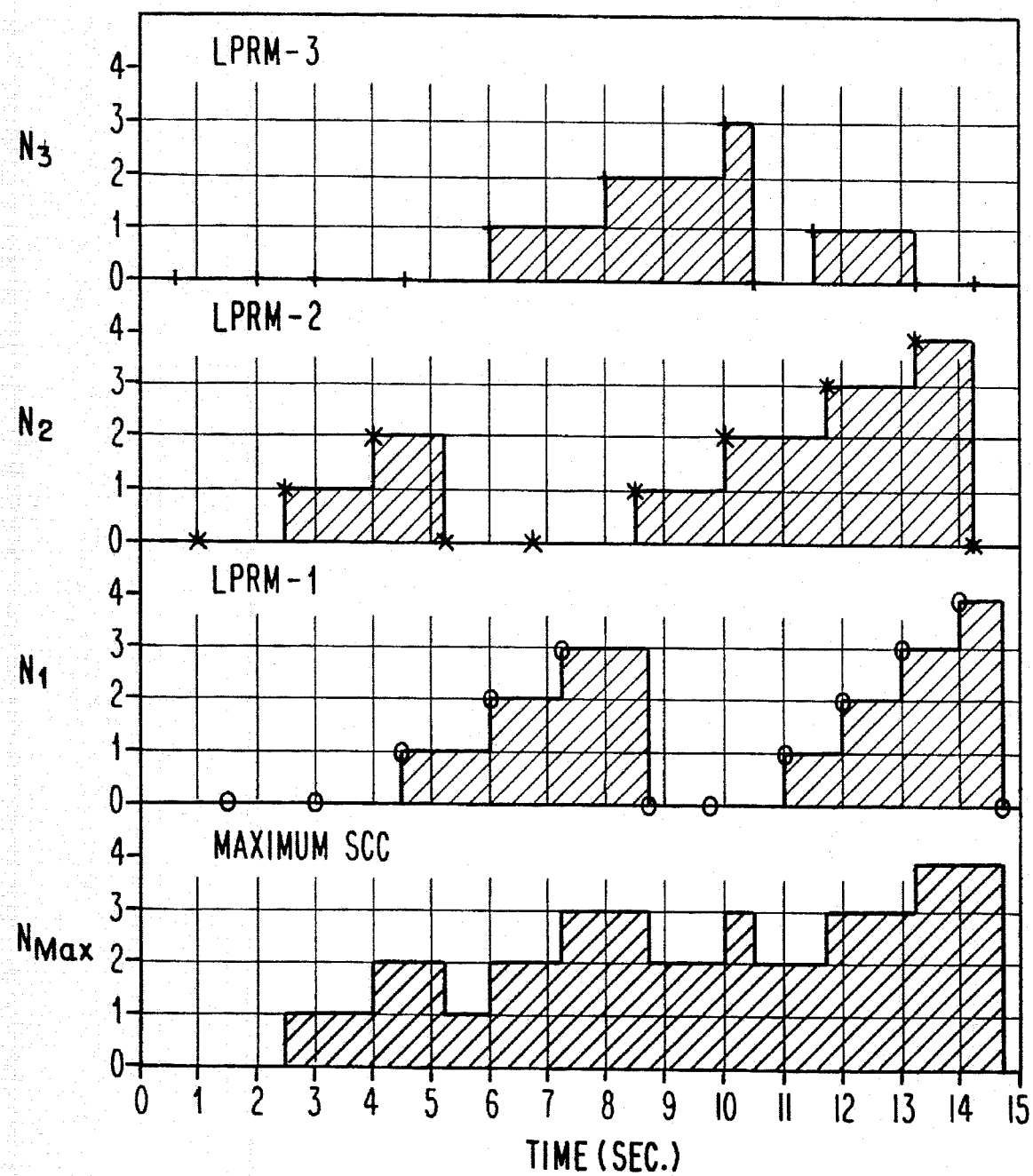
FIG. 9 presents time domain representations of the successive oscillation period confirmation count signal as determined in the present invention, for three individual in-core flux detectors, and the maximum successive confirmation count signal where three active in-core flux detectors and their output signals are used for illustration purposes.
Figure 10:
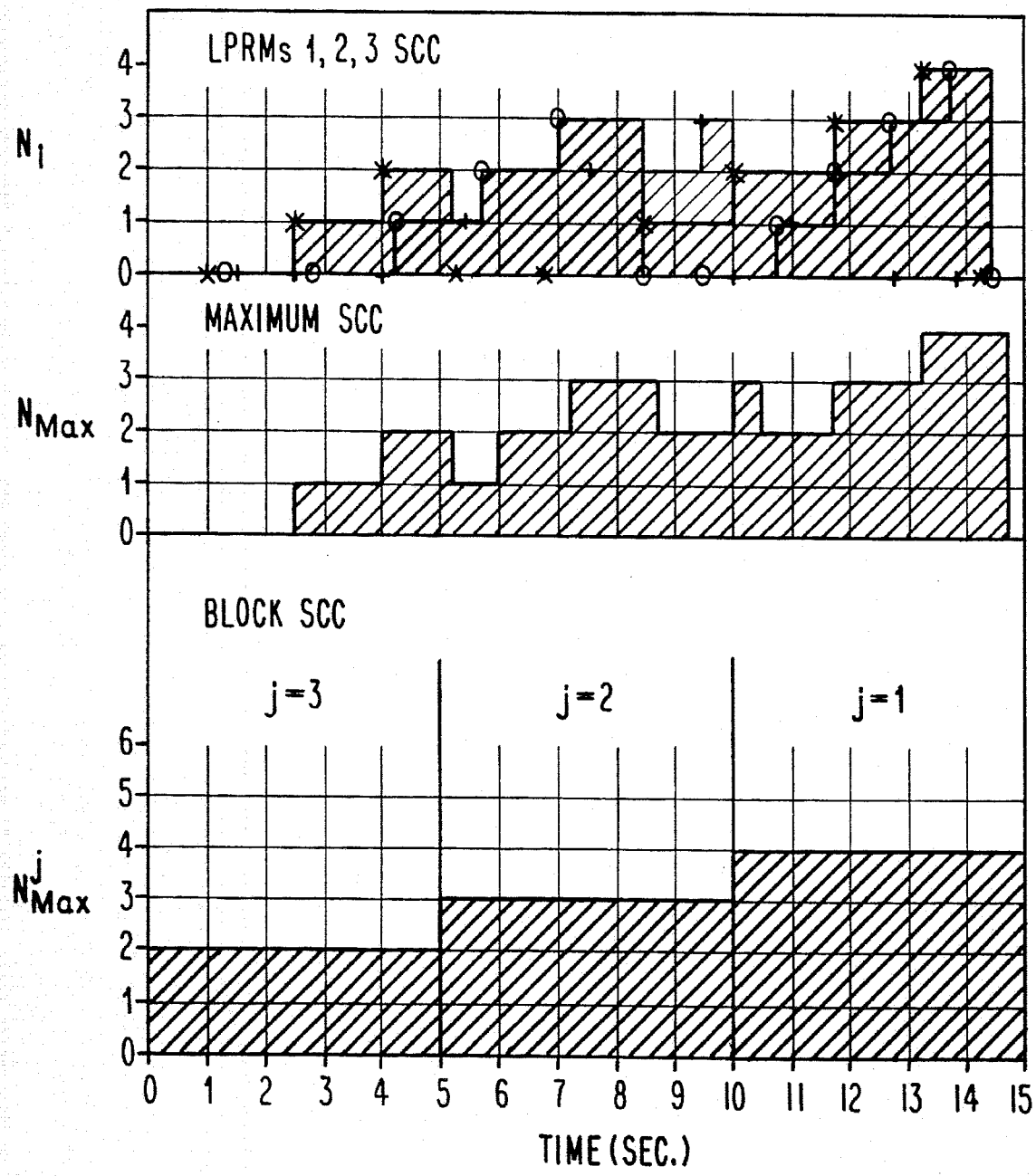
FIG. 10 presents time domain representations of the block successive confirmation count signal based on the maximum successive confirmation count signal of FIG. 9, where also shown are time domain illustrations of the corresponding in-core flux detector successive confirmation count signal and the maximum successive confirmation count signal of FIG. 9.

The application of the period based algorithm to any individual in-core flux detector signal can result in a spectrum of successive confirmation counts as a function of time. For any given in-core flux detector signal, a typical maximum count occurs only occasionally, i.e. on the order of minutes, that is representative of the reactor's thermal-hydraulic stability. To obtain the maximum successive confirmation count for an individual in-core flux detector, a long sample time duration is required by an analyzing means to establish this maximum successive confirmation count. Prior to the present invention, this time must also have been on the order of several minutes. In the present invention, this sample time duration is effectively achieved by sampling a large number ℓ of in-core flux detectors (an in-core flux detector group) in a shorter time period by use of the simulated decay ratio algorithm of the present invention. This time compression achieves the required effective single in-core flux detector sample time duration by sampling a large number of in-core neutron flux detectors in a short time span, herein called a time block. The successive confirmation count identified in a single, short time block is expected to result in an accurate representation of the typical maximum successive confirmation count associated with the reactor's thermal-hydraulic stability. For example, for a time block of 5 seconds applied to in-core flux detector group of 18 active in-core flux detectors and a sample time step of 50 milliseconds will contain a total of 100 sample time steps for each in-core flux detector and 90 seconds of integrated in-core flux detector sample time. For a time block of 30 seconds applied to in-core flux detector group of 18 active in-core flux detectors and a sample time step of 50 milliseconds will contain a total of 600 sample time steps for each in-core flux detector and 540 seconds of integrated in-core flux detector sample time. The block successive confirmation count performance is illustrated in FIG. 10 based on the maximum successive confirmation count shown in FIG. 9 where a constant time block of 5 seconds is assumed. The maximum simulated decay ratio signal determined for all groups combined ultimately calculated is utilized as an input signal to be applied to an alarm 80, display 60, and or rod control unit 105, or other suppression means. The benefits of this fast time are significant economic savings from reduced reactor down time that would otherwise occur when sufficient early warning of instability was not available, as well as improved flexibility and control of the reactor.

Each time block consists of many sample time steps, each of which is a small fraction of the characteristic period for unstable thermal-hydraulic oscillations. The successive confirmation count for all of the ℓ in-core flux detectors in a group is evaluated during each of these sample time steps. Since the successive confirmation count model is based on the maximum successive confirmation count, the system identifies this maximum count within each time block. The ℓ in-core flux detector's signals that belong to an in-core flux detector group are interrogated by the period based algoritm every sample time step ($t_n$), as described above. An in-core flux detector successive confirmation count ($N_i$) is established for each in-core flux detector (i=1,... ℓ) and the maximum successive confirmation count ($N_{Max}$) is calculated as the highest $N_i$ value for any in-core flux detector in the group per sample time step:

$$N_{Max}(t_n) = \text{Max } N_i(t_n) \text{ } \mathcal{Q} i=1$$

Since $N_{Max}$ is updated every sample time step ($t_n$) by interrogating all active in-core flux detectors in the in-core flux detector group, it will depend on the actual value and timing of the successive confirmation counts for each in-core flux detector. The maximum successive confirmation count is illustrated in FIG. 9 where three active in-core flux detector signals are used for illustration purposes. A constant time block of 5 seconds is used to illustrate how the block successive confirmation count is established.

Each time block consists of many sample time steps associated with all the in-core flux detectors in a group. The time block is selected to be sufficiently long such that variations in the maximum successive confirmation count ($N_{Max}$) response from one time block to another, considering all active in-core flux detectors in an in-core flux detector group and under unchanged stability conditions, are minimized. However, the time block is selected to be sufficiently short to allow fast algorithm response under changing stability conditions.

Each time block may be a constant increment of time, for example, anywhere from 1 to 60 seconds, but preferably 5 seconds, may be used. However, in the preferred simulated decay ratio algorithm, the time block size is dynamically selected to optimize the algorithm's performance for two competing objectives. Time compression is performed by sampling many incore flux detectors over a short time to simulate monitoring of a single in-core detector for a sufficient duration such that $N^j_{Max}$, the block successive confirmation count, is observed. It must therefore be large enough to ensure that the typical maximum successive confirmation count for the current reactor stability condition is captured. This minimizes the variations in $N^j_{Max}$ from one time block to the next. On the other hand, the time block size must not be so large that the simulated decay ratio algorithm's responsiveness to stability transients is adversely affected.

To address these objectives, and thereby optimize the simulated decay ratio algorithm effectiveness, a time varying time block is preferably utilized. Here, the time block is dynamically established by the algorithm based on the maximum successive confirmation count. Larger time blocks are used when the maximum successive confirmation count is low, to minimize simulated decay ratio uncertainty during normal reactor operations when large stability margin exists. At high decay ratios, when the maximum successive confirmation count is high, the onset of instability can occur rapidly, making the algorithm responsiveness paramount. Under these conditions, small time block sizes are assigned. A time block size for the $j^{th}$ time block, $\lambda_j$, which is a function of $N^j_{Max}$, is assigned based on the following relationship:

$$\lambda_j = \begin{cases} \lambda_{Min} & \text{if } |N^j_{Max}| \geq N^\lambda_{Max}| \\ \Gamma_j & \text{if } N^\lambda_{Min} < N^j_{Max} < N^\lambda_{Max} \\ \lambda_{Max} & \text{if } N^j_{Max} \leq N^\lambda_{Min} \end{cases}$$

$\lambda_{Min}$ and $\lambda_{Max}$ are the specified lower and upper bounds of the time block. $N^{80}_{Max}$ and $N^\lambda_{Min}$ are the block successive confirmation count, $N^j_{Max}$, values for which $\lambda_{Min}$ and $\lambda_{Max}$ are specified, respectively, when establishing the time block size. $\Gamma_j$ is assigned for imediate $N^j_{Max}$ values.

The value of $\lambda_{Min}$ should preferably not be selected below approximately five seconds to avoid spurious changes in $N^j_{Max}$. $\lambda_{Max}$ should preferably not be selected above approximately thirty seconds to provide a reasonable update frequency for $N^j_{Max}$. $N^\lambda_{Min}$, $N^\lambda_{Max}$, and $\Gamma_j$ are selected to provide appropriate transition from low confixation counts associated with large block sizes, to high confixation counts retiring small block sizes.

For example, assume $\lambda_{Min}$ and $\lambda_{Max}$ are equal to 5 and 30 seconds respectively. $N^\lambda_{Min}$ could be selected to be 5 indicating that count less than or equal to 5 is relatively stable and would require only a thirty second time block $N^\lambda_{Min}$ could be selected to be 8 indicating that any count greater than or equal to 8 is indicating a relatively unstable system and the fastest time block of 5 seconds is required for fast updates. Thus, values for $N^j_{Max}$ between 5 and 8 would be provided as transition points from the 5 second time intequal to 30 second intequal. Thus, $\Gamma$ could be valued at 20 seconds corresponding to an $N^j_{Max}$ of 6, and $\Gamma$ could be valued at 10 seconds for an $N^j_{Max}$ of 7, thereby providing a smooth transition. The following table shows these results in tabular form:

| $N^j_{Max}$ | 1 | 2 | 3 | 4 | 5 | 6 | 7 | 8 | 9 | 10 |
|---|---|---|---|---|---|---|---|---|---|---|
| $\lambda$ or $\Gamma$ | $\lambda_{Max}$ = 30 | $\lambda_{Max}$ = 30 | $\lambda_{Max}$ = 30 | $\lambda_{Max}$ = 30 | $\lambda_{Max}$ = 30 | $\Gamma_i$ = 20 | $\Gamma_i$ = 10 | $\lambda_{Min}$ = 5 | $\lambda_{Min}$ = 5 | $\lambda_{Min}$ = 5 |

Of course, the selected values for $\Gamma_1$ could vary depending on the specific confirmation count level that indicates instability. This level again depends on other selected values.

When reactor stability is decreasing rapidly, a maximum successive confirmation count can be generated, corresponding to the time block size specified by the above equation, that is smaller than the elapsed time of the present time block. For example, utilizing the above values, in a time block that is 30 seconds long corresponding to $N^j_{Max}=3$, it is possible for a maximum successive confirmation count of, for example, 6 to occur, which, in the above equation, would indicate a time block ($\Gamma$) of 20 seconds. To accommodate this potential condition, the algorithm time block size, $\overline{\lambda}_j$, is defined to be:

$$\overline{\lambda}_j = \begin{cases} t_j & \text{if } \lambda_j < t_j \\ \lambda_j & \text{Otherwise,} \end{cases}$$

where $t_j$ is the elapsed time of the $j^{th}$ block when $N^j_{Max}$ is identified. Thus, in this instance, if the time block increment is larger than 20 seconds it would end as soon as the $N^j_{Max}$ value of 6 is reached.

Likewise, when the reactor stability increases rapidly, the change in block size, for each successive block, is limited to $\lambda_{Min}$ to maintain simulated decay ratio responsiveness in providing an indication of reduced decay ratio. The algorithm time block size for this situation is defined as:

$$\overline{\lambda}_j = \begin{cases} \overline{\lambda}_{j+1} + \lambda_{Min} & \text{if } \lambda_j > \overline{\lambda}_{j+1} + \lambda_{Min} \\ \lambda_j & \text{Otherwise,} \end{cases}$$

where j+1 refers to the previous time block. Combining the above two equations, the algorithm time block is defined as:

$$\overline{\lambda}_j = \begin{cases} t_j & \text{if } \lambda_j < t_j \\ \overline{\lambda}_{j+1} + \lambda_{Min} & \text{if } \lambda_j > \overline{\lambda}_{j+1} + \lambda_{Min} \\ \lambda_j & \text{Otherwise,} \end{cases}$$

where $\lambda_j$ is defined above.

The block successive confirmation count ($N^j_{Max}$) is established to be the highest maximum successive confirmation count of all sample time steps belonging to a single time block j:

$$N^j_{Max} = \text{Max}\{N_{Max}\}_{Time\ Block\ j}$$

To overcome statistical variations in successive confirmation counts of successive time blocks, several techniques may be employed over selected time blocks to provide improved simulated decay ratio signal performance. These techniques need not be utilized if desired, or each may be utilized independently.

First, a spike rejection function may be used to minimize the impact of an unexpected, single large deviation in the successive confirmation count. Then, a successive confirmation count smoothing function uses the maximum confirmation count for several time periods and weight averages them to develop a consistent and responsive measure of the core stability performance. The simulated decay ratio signal may then be determined. These techniques are discussed in detail below.

Spike Rejection Process

The number of in-core flux detectors assigned to an in-core flux detector group is sufficiently large such that the block successive confirmation count represents the typical maximum confirmation count performance of an individual in-core flux detector. For example, as described above, approximately 20 in-core flux detector signals may constitute a group for a nuclear reactor having 164 in-core flux detectors in a typical nuclear reactor core. For unchanged stability conditions, the block successive confirmation count is expected to remain constant within plus or minus one confirmation count. However, occasional large variations in the block successive confirmation count from one time block to another may occur as a result of low number of valid in-core flux detectors within an in-core flux detector group or as a result of a low probability, atypical, successive confirmation count.

To minimize the occasional large variations in block successive confirmation counts between successive time blocks, a spike rejection function is introduced. The spike rejection function limits the change in the current block successive confirmation count relative to the previous time block's observed block successive confirmation count to no more than a selected spike rejection increment, $\delta$. The spike rejection function utilizes the block successive confirmation count and generates an effective successive confirmation count. The effective successive confirmation count ($\overline{N}j$) for the current time block j is defined as:

$$\overline{N}_j = \begin{cases} N^j_{Max} & \text{if } |N^j_{Max} - N^{j+1}_{Max}| \leq \delta \\ N^{j+1}_{Max} + \delta & \text{if } N^j_{Max} - N^{j+1}_{Max} > \delta \\ N^{j+1}_{Max} - \delta & \text{if } N^{j+1}_{Max} - N^j_{Max} < \delta \end{cases}$$

where j+1 corresponds to the previous time block. A typical value for $\delta$ is 2. Values of $\delta$ from approximately 2 to 4 will also yield adequate results, however, these values again are dependent on the value of other algorithm parameters.

For example, using the above equation with $\delta=2$, if the current block successive confirmation count ($N^j_{Max}$) is 8 and the previous block successive confirmation count ($N^{j+1}_{Max}$) is 6, the current effective successive confirmation count would be 8. If the current block successive confirmation count ($N^j_{Max}$) is 6 and the previous block successive confirmation count ($N^{j+1}_{Max}$) is 8, the current effective successive confirmation count would be 6. Note that the difference between the current and previous block successive confirmation counts is less than, or equal to, the spike rejection increment.

However, if the current block successive confirmation count ($N^j_{Max}$) is 6 and the previous block successive confirmation count ($N^{j+1}_{Max}$) is 9 the current effective successive confirmation count would be7. And also, if the current block successive confirmation count ($N^j_{Max}$) is 9 and the previous block successive confirmation count ($N^{j+1}_{Max}$) is 6, the current effective successive confirmation count would be 8. In the last two examples, note that the difference between current and previous block successive counts is greater than the spike rejection increment.

Figure 11:
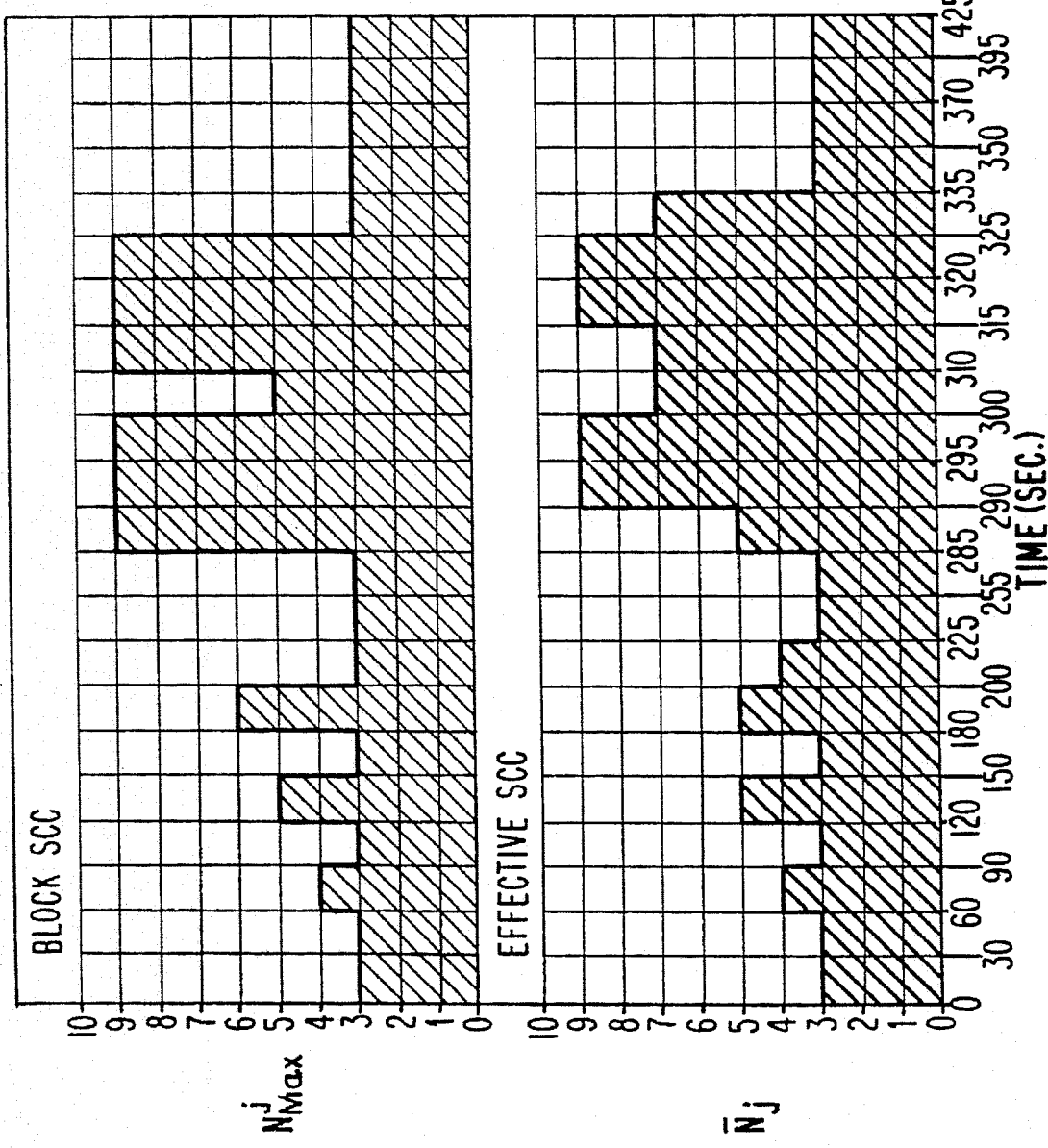
FIG. 11 is a time domain representation of an effective successive confirmation count signal which is the block successive confirmation count signal of FIG. 10 (also shown), for each time block, adjusted for spike rejection.

The spike rejection function minimizes the impact of an unexpected large deviation in the block successive confirmation count. If the block successive confirmation count is maintained at the rejected value for a second time block, no further rejection will occur since $N^j_{Max}$ is always compared to $N^{j+1}_{Max}$ and not to $\bar{N}_{j+1}$. Therefore, any increase or decrease in the block successive confirmation count that is greater than $\delta$, and is maintained in subsequent time blocks, will be fully reflected by the algorithm following the first rejection. The spike rejection function is designed to reject a single change in the successive confirmation count in the range of 3 to 4 or larger, for a $\delta$ equal to 2. Larger spikes are considered not probable. FIG. 11 illustrates an example of the effect of the spike rejection function on the block successive confirmation count, where $\delta=2$ is used, thus providing the effective successive confirmation count, $\bar{N}_j$.

Successive Confirmation Count Smoothing Process

A successive confirmation count smoothing function processes the effective successive confirmation count for preselected time blocks and generates the nominal successive confirmation count ($\bar{N}_{WT}$). The smoothing process is designed to minimize changes in the effective successive confirmation count resulting from statistical variations from one time block to another. These variations may occur since the time block interval is selected to be relatively small in order to maintain the algorithm responsiveness.

$\bar{N}_{WT}$ is used as an input to the successive confirmation count model to generate the simulated decay ratio. The successive confirmation count smoothing function is performed using a variable number of time blocks, defined by the current effective successive confirmation count. This function is designed to preserve the uncertainty in the simulated decay ratio signal. A weighting scheme is incorporated which emphasizes the leading time blocks and increases their importance for higher effective successive confirmation count values.

The number of time blocks used in the averaging process is determined based on decay ratio uncertainty considerations. Assuming a large number of in-core flux detectors in an in-core flux detector group and provided that the core stability conditions are constant, the variation in the effective successive confirmation count ($\bar{N}_1$) is limited to ±1 for any value of $\bar{N}_1$, since $\bar{N}_1$ represents a discrete value. The relationship between decay ratio (DR) and current effective successive confirmation count ($\bar{N}_1$), based on the successive confirmation model is:

$$DR = \Re^{\frac{2}{\bar{N}_1+2}}$$

In this equation, $\Re$ is a constant that depends on the plant-specific application of the detection system. This will be discussed further below.

The relative uncertainty in the decay ratio as a function of the expected variations in $\bar{N}_1$ is derived as:

$$\frac{\delta DR}{DR} = \frac{DR'}{DR} \times \delta \bar{N}_1$$

thus, $$\frac{\delta DR}{DR} \propto \frac{1}{(\bar{N}_1+2)^2} \times \delta \bar{N}_1$$

The number of time blocks used in the averaging process is determined by requiring that the relative uncertainty in decay ratio is preserved regardless of the value of $\bar{N}_1$. This is accomplished by varying the number of time blocks used in establishing the weight averaged value of the successive confirmation count. The number of time blocks K necessary to maintain a constant decay ratio uncertainty, independent of $\bar{N}_1$, is determined by:

$$\frac{\frac{\delta DR}{DR}\big|_{\bar{N}_1}}{K} = \text{Constant}$$

where K is the time block integral. The expected variation in $\bar{N}$ is ±1 independent of the decay ratio value. By combining the last two equations, and assuming $\bar{N}_1$ is constant, K can be expressed as:

$$K = C \times \frac{1}{(\bar{N}_1+2)^2}$$

where C is a constant.

The proportionality constant, C, is determined by specifying the effective successive confirmation count associated with the minimum K, $K_{Min}$, defined as $\bar{N}(K_{Min})$. The value $\bar{N}(K_{Min})$ is established based on the successive confirmation count model calibration, and is associated with reactor conditions at the onset of instability. Typical values of $\bar{N}(K_{Min})$ may be approximately 8 to 15. Applying these requirements to the above equation yields:

$$K_{Min} = C \times \frac{1}{[\bar{N}(K_{Min})+2]^2}$$

Thus, $$K = K_{Min} \times \left[ \frac{\bar{N}(K_{Min})+2}{\bar{N}_1+2} \right]^2$$

Reliance on a single time block for $\bar{N}_1$ is typically avoided by setting the minimum value of K, $K_{Min}$, equal to 2. A maximum value of K, $K_{Max}$, is also specified to limit the number of time blocks used in the averaging at low confirmation counts. $K_{Max}$ is associated with an effective successive confirmation count, $\bar{N}(K_{Max})$ which can be calculated from the previous equation:

$$\bar{N}(K_{Max}) = [\bar{N}(K_{min})+2] \times \sqrt{\frac{K_{Min}}{K_{Max}}} - 2$$

Values for $K_{Min}$ may range from approximately 1 to 5. Values for $K_{Max}$ may range from approximately 5 to 100. The time block integral for the current time block, $K(\bar{N}_1)$, is then defined as:

$$K(\bar{N}_1) = K_{min} \text{ if } \bar{N}_1 \geq \bar{N}(K_{Min})$$

$$K(\bar{N}_1) = K_{Min} \times \left[ \frac{\bar{N}(K_{Min})+2}{\bar{N}_1+2} \right]^2 \text{ if } \bar{N}(K_{Max}) < \bar{N}_1 < \bar{N}(K_{Min})$$

-continued
$$K(\overline{N}_1) = K_{Max} \text{ if } \overline{N}_1 \leq \overline{N}(K_{Max})$$

To ensure reasonable responsiveness of the algorithm for a decreasing trend in the successive confirmation count, any increase in K is limited to one time block relative to the previous time block's K value. Therefore, the algorithm time block integral for the current time block, $\overline{K}(\overline{N}_1)$, is given by:

$$\overline{K}(\overline{N}_1) = Min\{K(\overline{N}_1), K(\overline{N}_2) + 1\}.$$

A linear weighting scheme is employed to increase the importance of the leading time blocks and thereby enhance the algorithm responsiveness. The weights, $W_j$, used in the averaging of the time blocks, based on the effective successive confirmation count of the current time block, $\overline{N}_1$, are provided by:

$$W_j(\overline{N}_j) = \overline{K}(\overline{N}_1) - 1 \text{ for time block } j=1, \ldots \overline{K}(\overline{N}_1),$$

where the current time block is j=1 and the time blocks are incremented in reverse time order.

The algorithm responsiveness increases with increased $\overline{N}_1$ values since the corresponding number of time blocks used (K) decreases, and therefore, the relative weight of the leading time blocks increases (e.g., for K=2, the relative weight for $\overline{N}_1$ is 66%, for K=3, 50%, and for K=4, 40%).

The nominal successive confirmation count ($\overline{N}_{WT}$) can now be expressed as:

$$\overline{N}_{WT} = \frac{\sum_{j=1}^{\overline{K}(\overline{N}_1)} [\overline{K}(\overline{N}_1) - j + 1] \times \overline{N}_j}{\sum_{j=1}^{\overline{K}(\overline{N}_1)} j}$$

where K is a function of $\overline{N}_1$.

Figure 12:
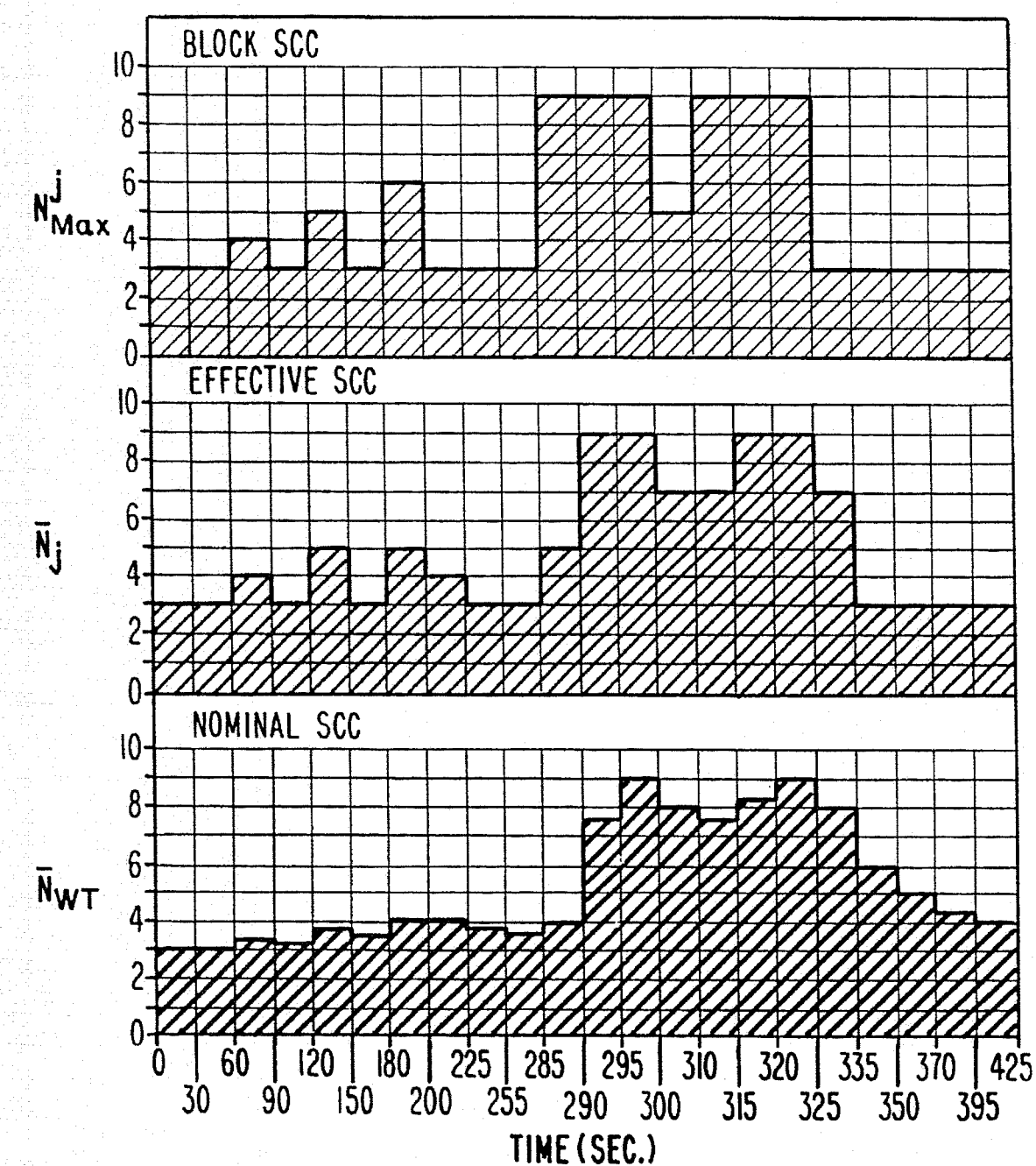
FIG. 12 is a time domain representation of the nominal successive confirmation count signal corresponding to the effective successive confirmation count signal of FIG. 11 (also illustrated here) and the block successive confirmation count signal of FIG. 10 (also illustrated here).

FIG. 12 illustrates the nominal successive confirmation count corresponding to the effective successive confirmation count of FIG. 11. The smoothing function (the equation above) provides a smooth response without any significant loss of algorithm responsiveness at high successive confirmation count. FIG. 12 is based on the relationship in the equation above.

Simulated Decay Ratio Signal

The nominal successive confirmation count is used as an input to the successive confirmation count model to generate the simulated decay ratio (SDR) in the following relationship:

$$SDR = \Re^{\frac{2}{\overline{N}_{WT}+2}}$$

In this relationship, $\Re$ depends on the plant specific application of the detection system.

The successive confirmation count model does not explicitly model reactor conditions at the threshold of instability. Specifically, it underestimates the successive confirmation count at high decay ratios because the increased coherence of the reactor response is not modeled. As a result, the model decay ratio approaches unity only when the successive confirmation count approaches infinity. To address this consideration, the successive confirmation count model can be reformulated as:

$$SDR = a \times b^{\frac{2}{\overline{N}_{WT}+2}}$$

where a and b are constants that are determined based on a model-specific selection of two pairs of (SDR,$\overline{N}_{WT}$) values. They can be selected to match the successive confirmation count performance at the low decay ratio range and the period based algorithm successive confirmation count setpoint that is used for either reactor alarm or trip indication at the high decay ratio range. For example, if the simulated decay ratio=0.4 for $\overline{N}_{WT}$=2 and simulated decay ratio=1.0 for $\overline{N}_{WT}$=11 are assumed, (consistent with discussion above) the resultant model is $$SDR = 1.5 \times 0.07^{\frac{2}{\overline{N}_{WT}+2}}$$

Figure 14:
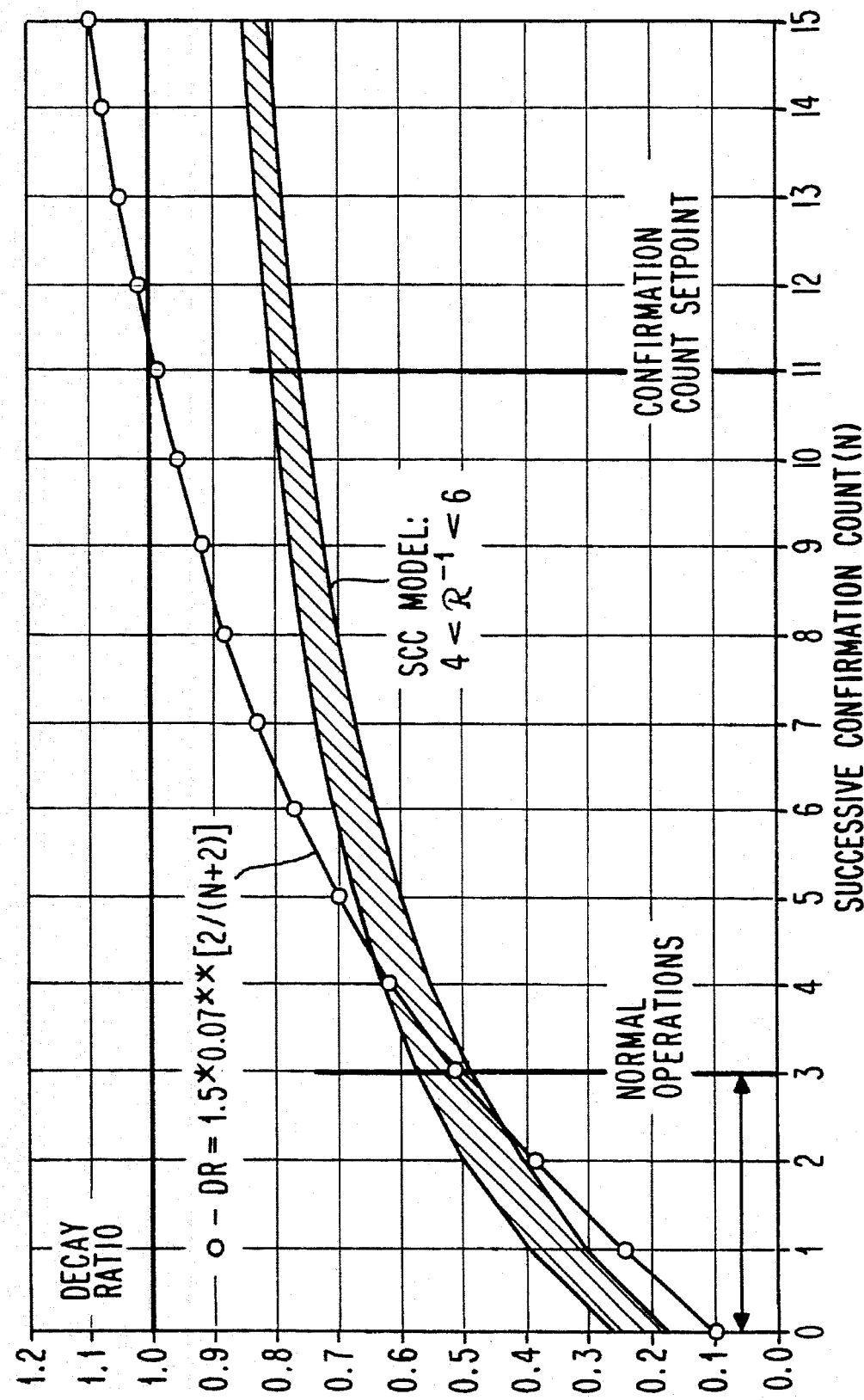
FIG. 14 is a time domain representation of a typical simulated decay ratio signal of the present invention wherein the decay ratio is shown as a function of successive confirmation count.

This model is illustrated in FIG. 14 where it is compared to that of the successive confirmation count.

Figure 13:
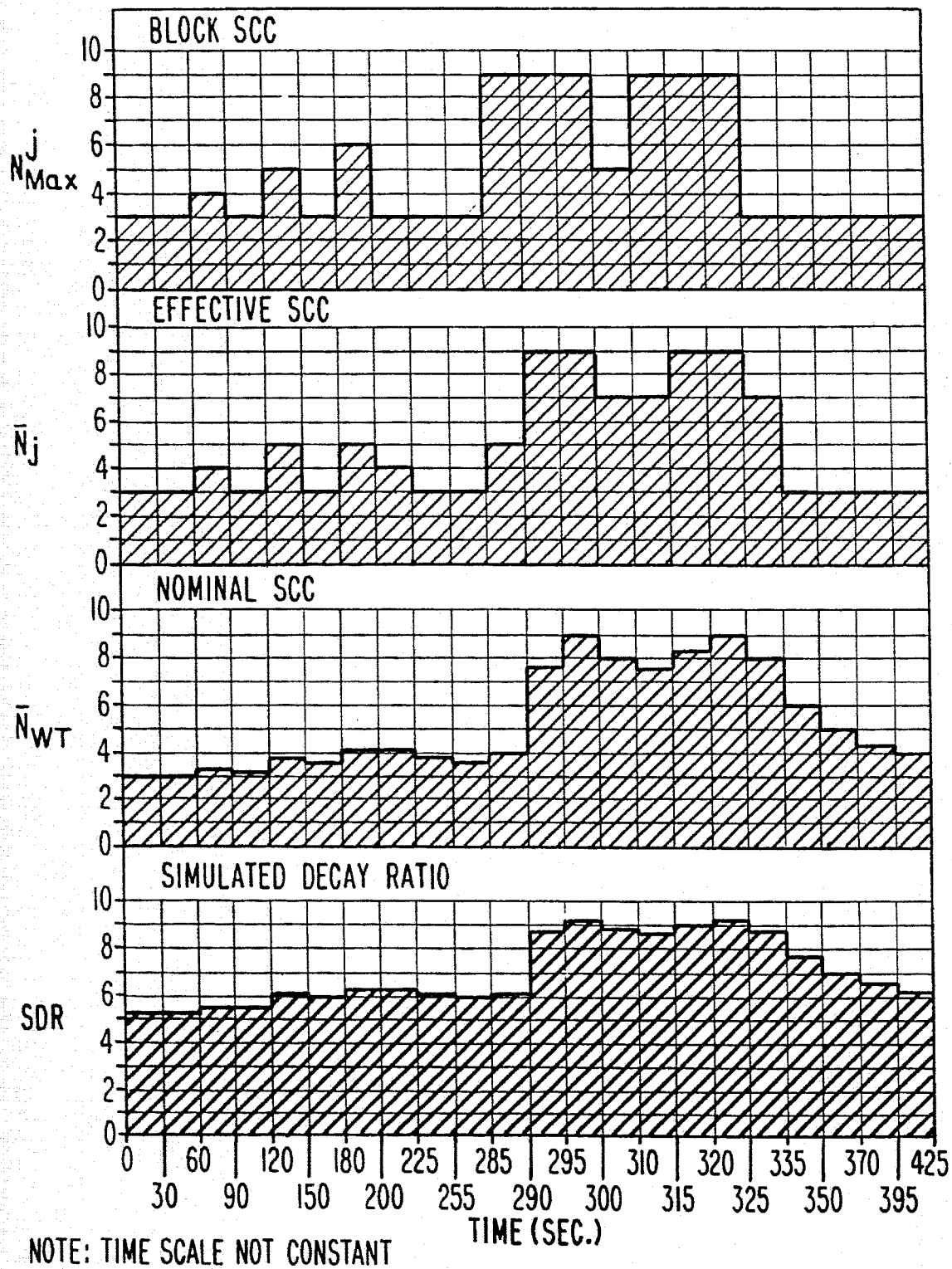
FIG. 13 is a time domain representation of the simulated decay ratio signal which is based on the nominal successive confirmation count signal of FIG. 12 (also shown) which is based on the effective successive confirmation count signal of FIG. 11 (also shown) and which is also based on the block successive confirmation count signal of FIG. 10 (also shown).

FIG. 13 illustrates the simulated decay ratio which is based on the nominal successive confirmation count data shown in FIG. 12. The simulated decay ratio forms a smooth decay ratio function which is responsive to fast variations in core stability conditions.

The simulated decay ratio signal from all in-core detector groups are combined to establish a system simulated decay ratio output signal. The signal combining process may consist of any statistical combination such as the average, maximum, or minimum of the selected individual simulated decay ratio output signal from each in-core detector group.

As seen in FIGS. 1, 6 and 7, the simulated decay ratio output signal may then be delivered by the signal processor 25 to the core monitoring computer system 50 which outputs to various output devices. Such output devices may include a high decay ratio alarm 80, where an audible alarm is activated when the simulated decay ratio signal reaches a pre-determined stability margin. Alternatively, or additionally, the simulated decay ratio output signal may be delivered by the core monitoring computer system 50 to a visual digital display 70 or analog display 60 which presents the simulated decay ratio signal level to a nuclear core control operator. The signal could additionally be delivered to an interface for passing a control signal to automatic controls for automatic implementation of a recommended control action to improve core stability 105 (FIG. 1). The particular arrangements stated here are meant to be illustrative only and not limiting as to the scope of the invention.

It is understood that one skilled in the art of nuclear reactor cores would have the skill required to select the proper combinations of values for the selectable components of the above equations.

Example Application

An example application of the simulated decay ratio with representative parameters values is described below and illustrated in FIG. 13. The block successive confirmation count used in this example is shown in the figure. Large as well as fast variations in the block successive confirmation count values are used to demonstrate the different algorithm features. Actual plant performance is expected to be more uniform, and result in smoother and slower block successive confirmation count variations. The initial block successive confirmation count value depicted in the figure is assumed to exist for all previous time blocks. Note that for illustration convenience the time scale of FIG. 13 is not constant.

Dynamic time block Input:

$\lambda_{Min}=5$ seconds,
$\lambda_{Max}=30$ seconds,
$\overline{N}^\lambda_{Min}=5$,
$\overline{N}^\lambda_{Max}8$,

| $\overline{N}^j_{Max}$ | 1 | 2 | 3 | 4 | 5 | 6 | 7 | 8 | 9 | 10 |
|---|---|---|---|---|---|---|---|---|---|---|
| $\lambda$ or $\Gamma$ | $\lambda_{Max}$ =30 | $\lambda_{Max}$ =30 | $\lambda_{Max}$ =30 | $\lambda_{Max}$ =30 | $\lambda_{Max}$ =30 | $\Gamma_i$ =20 | $\Gamma_i$ =10 | $\lambda_{Min}$ =5 | $\lambda_{Min}$ =5 | $\lambda_{Min}$ =5 |

Spike Rejection Function input:
$\delta=2$
Smoothing Function input:
$K_{Min}=2$,
$\overline{N}(K_{Min})=10$,
$K_{Max}=12$,
$\overline{N}(K_{Max})=3$, as calculated per above equation
$K(\overline{N}_{Max})$ as calculated per above equations:

| $\overline{N}_1$ | ≤3 | 4 | 5 | 6 | 7 | 8 | 9 | ≥10 |
|---|---|---|---|---|---|---|---|---|
| $K(\overline{N}_1)$ | 12 | 8 | 6 | 5 | 4 | 3 | 2 | 2 | simulated decay ratio input:
SDR=0.4 for $\overline{N}_{WT}=2$ at low decay ratio range,
SDR=1.0 for $\overline{N}_{WT}=11$ at high decay ratio range, $$SDR = 1.5 \times 0.07^{\frac{2}{\overline{N}_{WT}+2}} \quad (a=1.5, b=0.07)$$

(This model is illustrated in FIG. 14 where it is compared to the successive confirmation count.

The effective successive confirmation count ($\overline{N}_j$), shown in FIG. 13 illustrates the effect of the spike rejection function on the block successive confirmation count where large and sudden atypical increases or decreases in block successive confirmation counts are suppressed. The nominal successive confirmation count ($\overline{N}_{WT}$) illustrates the effect of the smoothing function which results in a smooth algorithm behavior without any significant loss of algorithm responsiveness at high successive confirmation counts. Finally, the simulated decay ratio forms a smooth decay ratio function which is responsive to fast variations in core stability conditions.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims. Moreover, the present invention has been described as applied to a boiling water reactor electric power generating unit, but it may have application to other types of process control systems.

We claim:

1. A computer-based power oscillation monitoring system for detection and indication of thermal-hydraulic stability margin in a nuclear reactor having a core including a plurality of fuel assemblies, said system comprising:
   a) a plurality of neutron flux detectors in the nuclear reactor core contiguous to the fuel assemblies, said plurality of flux detectors being distributed throughout the reactor core, said plurality of flux detectors providing a like plurality of output signals, each output signal being indicative of the neutron flux of the portion of the core adjacent the corresponding flux detector;
   b) a computer-based detector processing system utilizing:
      i) a means for determining a density-wave related periodicity signal for each flux detector output signal utilizing a period-based algorithm; and
      ii) a means for generating a simulated decay ratio signal for the reactor core, based on the periodicity signals utilizing a simulated decay ratio algorithm; and
   c) a corrective signal means for improving reactor stability margin when said simulated decay ratio signal reaches a predetermined level.

2. The computer-based oscillation detection system of claim 1, wherein said system includes a frequency filter for removing select frequency components of said flux detector output signals that are of a frequency in excess of a characteristic frequency range of a thermal-hydraulic instability.

3. The filter of claim 2, wherein the filter provides for removal of select components of said flux detector output signal that are of a frequency greater than approximately 0.7 Hz.

4. The computer-based oscillation detection system of claim 1, wherein the neutron flux detectors are local power range monitors.

5. The computer-based oscillation detection system of claim 1, wherein the simulated decay ratio algorithm divides the plurality of flux detector output signals into a plurality of groups, each group corresponding to a plurality of flux detectors spread throughout the core, and each group being processed individually and simultaneously to yield the simulated decay ratio signal.

6. The computer-based oscillation detection system of claim 1, wherein the simulated decay ratio algorithm includes a spike rejection means to minimize the effect of unexpected, single, large deviations in the periodicity signals of the flux detectors.

7. The computer-based oscillation detection system of claim 1, wherein the simulated decay ratio algorithm includes a smoothing function means.

8. A computer-based power oscillation monitoring system for detection and indication of thermal-hydraulic stability margin in a nuclear reactor having a core including a plurality of fuel assemblies, said system comprising:
   a) a plurality of neutron flux detectors in the nuclear reactor core contiguous to the fuel assemblies, said plurality of flux detectors being distributed throughout the reactor core, said plurality of flux detectors providing a like plurality of output signals, each output signal being indicative of the neutron flux of the portion of the core adjacent the corresponding flux detector, said plurality of output signals being organized into a plurality of flux detector output signal groups;
   b) a frequency filter for removing select frequency components of said flux detector output signals that are of a frequency in excess of a characteristic frequency range of a thermal-hydraulic instability;
   c) a computer-based detector processing system utilizing:
      i) a means for determining a density wave related periodicity signal for each flux detector output signal utilizing a period-based algorithm; and
      ii) a means for generating a simulated decay ratio signal for the reactor core for each group of flux detector signals, based on the periodicity signals for the flux detector outputs utilizing a simulated decay ratio algorithm, including a spike rejection means to minimize the effect of unexpected, single, large deviations in the periodicity signals of the flux detectors, and including a simulated decay ratio smoothing function means; and d) a corrective signal means for improving reactor stability margin when said simulated decay ratio signal reaches a predetermined level.

9. A computer-based power oscillation monitoring system for detection and indication of thermal-hydraulic stability margin in a nuclear reactor having a core including a plurality of fuel assemblies, said system comprising:

a) a plurality of neutron flux detectors in the nuclear reactor core contiguous to the fuel assemblies, said flux detectors being approximately equally distributed throughout the reactor core, said plurality of flux detectors providing a like plurality of output signals, each output signal being indicative of the power density of the portion of the core adjacent the corresponding flux detector, said plurality of output signals organized into one or more flux detector output signal groups;

b) a computer-based detector processing system utilizing:

i) a means for generating a plurality of successive confirmation count signals corresponding to each flux detector output signal in each group of flux detector output signals, said means using a period based algorithm that employs an oscillation detection counting means to process each flux detector output signal to yield a successive confirmation count signal for each flux detector output signal in each group, each successive confirmation count signal being indicative of the corresponding flux detector output signal periodicity; and ii) a means for generating a simulated decay ratio signal for the reactor core, based on the successive confirmation count signals from the groups of flux detectors utilizing a simulated decay ratio algorithm having:

A) a means to generate a block successive confirmation count signal for each group of flux detector signals, each block successive confirmation count signal being determined by use of an oscillation count combining means, said count combining means analyzing the successive confirmation count signals determined for each group of flux detector signals over continuous, successive time block intervals and combining all successive confirmation count signals in a group every time block to determine the single flux detector signal in the group having a maximum successive confirmation count signal value per time block, each block successive confirmation count signal having a constant value during a time block related to the value of the single flux detector signal in the time block with the maximum successive confirmation count signal value in the time block; and B) a calculation means for providing a simulated decay ratio signal in a time block for each group of flux detector signals based on the modified confirmation count signal for each group of flux detectors; and c) a corrective signal means for improving reactor stability margin when said simulated decay ratio signal reaches a predetermined level.

10. The computer-based oscillation detection system of claim 9, wherein said system includes a frequency filter for removing frequency components of said flux detector output signals that are of a frequency in excess of a characteristic frequency range of a thermal-hydraulic instability.

11. The filter of claim 10, wherein the filter provides for removal of select components of said flux detector output signal that are of a frequency greater than approximately 0.7 Hz.

12. The computer-based oscillation detection system of claim 9, wherein the neutron flux detectors are local power range monitors.

13. The computer-based oscillation detection system of claim 9, wherein said time block is in the range of approximately 1 to 60 seconds.

14. The computer-based oscillation detection system of claim 9, wherein said time block is dynamically established.

15. The computer-based oscillation detection system of claim 9, wherein the simulated decay ratio algorithm includes a spike rejection means to generate an effective successive confirmation count signal based on the block successive confirmation count signal to minimize the effect of unexpected, single, large deviations in the block successive confirmation count signal.

16. The computer-based oscillation detection system of claim 9, wherein the simulated decay ratio algorithm includes a smoothing function means to process the effective confirmation count signal to generate a nominal successive confirmation count signal that minimizes changes in the block successive confirmation count resulting from statistical variations from one time block to another.

17. The computer-based oscillation detection system of claim 9, wherein the simulated decay ratio algorithm includes a spike rejection means to generate an effective successive confirmation count signal based on the block successive confirmation count signal to minimize the effect of unexpected, single, large deviations in the block successive confirmation count signal, and a smoothing function means to process the effective successive confirmation count signal to generate a nominal successive confirmation count signal that minimizes changes in the block successive confirmation count resulting from statistical variations from one time block to another.

18. A computer-based power oscillation monitoring system for detection and indication of thermal-hydraulic instabilities in a nuclear reactor having a core including a plurality of fuel assemblies, said system comprising:

a) a plurality of neutron flux detectors in the nuclear reactor core contiguous to the fuel assemblies, said flux detectors being distributed throughout the reactor core, said plurality of flux detectors providing a like plurality of output signals, each said output signal being indicative of the neutron flux of the portion of the core adjacent the corresponding flux detector, said plurality of output signals being organized into one or more flux detector output signal groups;

b) a frequency filter for removing select frequency components of said flux detector output signals that are of a frequency in excess 0.7 Hz;

c) a computer-based detector processing system utilizing:

i) a means for generating a plurality of successive confirmation count signals corresponding to each flux detector output signal in each group of flux detector output signals, said means using a period based algorithm that employs an oscillation counting means to process each flux detector output signal to yield a successive confirmation count signal for each flux detector output signal in each group, each successive confirmation count signal being indicative of the corresponding flux detector output signal periodicity; and ii) a means for generating a simulated decay ratio signal for the reactor core, based on the successive confirmation count signals for the groups of flux detectors utilizing a simulated decay ratio algorithm having:
A) a means to generate a block successive confirmation count signal for each group of flux detector signals, each block successive confirmation count signal being determined by use of an oscillation count combining means, said count combining means analyzing the successive confirmation count signals determined for each group of flux detector signals over continuous, successive time block intervals and combining all successive confirmation count signals in a group every time block to determine the single flux detector signal in the group having a maximum successive confirmation count signal value per time block, each block successive confirmation count signal having a constant value during a time block related to the value of the single flux detector signal in the time block with the maximum successive confirmation count signal value in the time block;
B) a spike rejection means to generate an effective successive confirmation count signal to minimize the effect of unexpected, single, large deviations in the block successive confirmation count signal in successive time blocks;
C) a smoothing function means to process the effective successive confirmation count to generate a nominal successive confirmation count that minimizes changes in the block successive confirmation count resulting from statistical variations from one time block to another; and
D) a calculation means for providing a simulated decay ratio signal in a time block for each group of detectors based on the previously modified confirmation count signal per time block for each group of flux detectors; and d) a suppression signal means for issuing an oscillation suppression signal when said simulated decay ratio signal in any group reaches a predetermined level.

19. A computer-based method for detecting, monitoring and indicating thermal-hydraulic stability margin in a nuclear reactor having a core including a plurality of fuel assemblies, said system comprising:
a) providing a plurality of neutron flux detectors in the nuclear reactor core contiguous to the fuel assemblies, said plurality of flux detectors being distributed throughout the reactor core, said plurality of flux detectors providing a like plurality of output signals, each output signal being indicative of the power density of the portion of the core adjacent the corresponding flux detector;
b) processing said output signal of each flux detector utilizing a computer-based detector processing system by the steps of:
i) utilizing a period based algorithm that employs a means for determining a density wave related periodicity signal for each flux detector output signal; and
ii) utilizing a simulated decay ratio algorithm that employs a means for generating a simulated decay ratio signal for the reactor core, based on the periodicity signals for the flux detectors; and
c) providing a corrective signal means for improving reactor stability margin when said simulated decay ratio signal reaches a predetermined level.

20. The computer-based method of claim 19, wherein said method includes providing a frequency filter for removing frequency components of said flux detector output signals that are of a frequency in excess of a characteristic frequency range of a thermal-hydraulic instability.

21. The computer-based method of claim 20, wherein the step of providing the filter provides for removal of select components of said flux detector output signal that are of a frequency greater than approximately 0.7 Hz.

22. The computer-based method of claim 19, wherein the step of providing the neutron flux detectors includes providing local power range monitors spatially distributed throughout the core.

23. The computer-based method of claim 19, wherein the step of processing the output signal employing the simulated decay ratio algorithm includes dividing the plurality of flux detector output signals into one or more groups, each group corresponding to a plurality of flux detectors spread throughout the core, and each group being processed individually and simultaneously to yield the simulated decay ratio signal.

24. The computer-based method of claim 19, wherein the step of processing the output signal employing the simulated decay ratio algorithm includes employing a spike rejection means to minimize the effect of unexpected, single, large deviations in the periodicity signals of the flux detectors.

25. The computer-based method of claim 19, wherein the step of processing the output signal employing the simulated decay ratio algorithm includes employing a smoothing function means.

26. A computer-based method for detecting, monitoring and indicating thermal-hydraulic stability margin in a nuclear reactor having a core including a plurality of fuel assemblies, said system comprising:
a) providing a plurality of neutron flux detectors in the nuclear reactor core contiguous to the fuel assemblies, said plurality of flux detectors being distributed throughout the reactor core, said plurality of flux detectors providing a like plurality of output signals, each output signal being indicative of the neutron flux of the portion of the core adjacent the corresponding flux detector;
b) providing a frequency filter for removing select frequency components of said flux detector output signals that are of a frequency in excess of a characteristic frequency range of a thermal-hydraulic instability;
c) processing said output signal of each flux detector utilizing a computer-based detector processing system by the steps of:
i) utilizing a period based algorithm that employs a means for determining density wave related periodicity signal for each flux detector output signal; and
ii) utilizing a simulated decay ratio algorithm that employs a means for generating a simulated decay ratio signal for the reactor core, based on the periodicity signals for the flux detectors, including employing a spike rejection means to minimize the effect of unexpected, single, large deviations in the periodicity signals, and including employing a smoothing function means; and
d) providing a corrective signal means for improving reactor stability margin when said simulated decay ratio signal reaches a predetermined level.

27. A computer-based method for detecting, monitoring, and indicating thermal-hydraulic stability margin in a nuclear reactor having a core including a plurality of fuel assemblies, said system comprising:
a) providing a plurality of neutron flux detectors in the nuclear reactor core contiguous to the fuel assemblies, said flux detectors being distributed throughout the reactor core, said plurality of flux detectors providing a like plurality of output signals, each output signal being indicative of the power density of the portion of the core adjacent the corresponding flux detector, said plurality of output signals being organized into a one or more flux detector output signal groups;

b) processing said output signal of each flux detector utilizing a computer-based detector signal processing system by the steps of:
   i) utilizing a period based algorithm that employs a means for generating a plurality of successive confirmation count signals corresponding to each flux detector output signal in each group of flux detector output signals, said means using a period based algorithm that employs an oscillation detection counting means to process each flux detector output signal to yield a successive confirmation count signal for each flux detector output signal in each group, each successive confirmation count signal being indicative of the corresponding flux detector output signal periodicity; and
   ii) utilizing a simulated decay ratio algorithm that provides a simulated decay ratio signal for the reactor core for each group of flux detectors, based on the successive confirmation count signals for the groups of flux detectors, said simulated decay ratio algorithm having:
      A) a means to generate a block successive confirmation count signal for each group of flux detector signals, each block successive confirmation count signal being determined by use of an oscillation count combining means, said count combining means analyzing the successive confirmation count signals determined for each group of flux detector signals over continuous, successive time block intervals and combining all successive confirmation count signals in a group every time block to determine the single flux detector signal in the group having a maximum successive confirmation count signal value per time block, each block successive confirmation count signal having a constant value during a time block related to the value of the single flux detector signal in the time block with the maximum successive confirmation count signal value in the time block; and
      B) a calculation means for providing a simulated decay ratio signal in a time block for each group of flux detector signals based on the modified confirmation count signal for each group of flux detectors; and c) providing a corrective signal means for improving reactor stability margin when said simulated decay ratio signal reaches a predetermined level.

28. The computer-based method of claim 27, including frequency filtering for removal of select frequency components of said flux detector output signals that are of a frequency in excess of a characteristic frequency range of a thermal-hydraulic instability.

29. The filter of claim 28, wherein the step of filtering includes removing select components of said flux detector output signal that are of a frequency greater than approximately 0.7 Hz.

30. The computer-based method of claim 27, wherein the neutron flux detectors are local power range monitors.

31. The computer-based method of claim 27, wherein each said time block is in the range of approximately 1 to 60 seconds.

32. The computer-based method of claim 11, wherein said time block is dynamically established.

33. The computer-based method of claim 27, including providing a spike rejection means to generate an effective successive confirmation count signal based on the block successive confirmation count signal to minimize the effect of unexpected, single, large deviations in the block successive confirmation count signal.

34. The computer-based method of claim 27, including providing a smoothing function means to process the effective confirmation count signal to generate a nominal successive confirmation count signal that minimizes changes in the block successive confirmation count resulting from statistical variations from one time block to another.

35. The computer-based method of claim 27, including providing a spike rejection means to generate an effective successive confirmation count signal based on the block successive confirmation count signal to minimize the effect of unexpected, single, large deviations in the block successive confirmation count signal, and a smoothing function means to process the effective successive confirmation count signal to generate a nominal successive confirmation count signal that minimizes changes in the block successive confirmation count resulting from statistical variations from one time block to another.

36. A computer-based method for detecting, monitoring and indicating thermal-hydraulic stability margin in a nuclear reactor having a core including a plurality of fuel assemblies, said system comprising:
   a) providing a plurality of neutron flux detectors in the nuclear reactor core contiguous to the fuel assemblies, said flux detectors being distributed throughout the reactor core, said plurality of flux detectors providing a like plurality of output signals, each output signal being indicative of the power density of the portion of the core adjacent the corresponding flux detector, said plurality of output signals being organized into one or more of flux detector output signal groups;
   b) filtering for removal of select frequency components of said flux detector output signals that are of a frequency in excess 0.7 Hz;
   c) processing said output signal of each flux detector utilizing a computer-based detector signal processing system by the steps of:
      i) providing a means for generating a plurality of successive confirmation count signals corresponding to each flux detector output signal in each group of flux detector output signals, said means using a period based algorithm that employs an oscillation detection counting means to process each flux detector output signal to yield a successive confirmation count signal for each flux detector output signal in each group, each successive confirmation count signal being indicative of the corresponding flux detector output signal periodicity; and
      ii) providing a means for generating a simulated decay ratio signal for the reactor core, based on the successive confirmation count signals for the groups of flux detectors utilizing a simulated decay ratio algorithm having:
         A) a means to generate a block successive confirmation count signal for each group of flux detector signals, each block successive confirmation count signal being determined by use of a count combining means, said count combining means analyzing the successive confirmation count signals determined for each group of flux detector signals over continuous, successive time block intervals and combining all successive confirmation count signals in a group every time block to determine the single flux detector signal in the group having a maximum successive confirmation count signal value per time block, each block successive confirmation count signal having a constant value during a time block related to the value of the single flux detector signal in the time block with the maximum successive confirmation count signal value in the time block;

B) a spike rejection means to generate an effective successive confirmation count signal to minimize the effect of unexpected, single, large deviations in the block successive confirmation count signal in successive time blocks;

C) a smoothing function means to process the effective successive confirmation count to generate a nominal successive confirmation count that minimizes changes in the block successive confirmation count resulting from statistical variations from one time block to another; and D) a calculation means for providing a simulated decay ratio signal in a time block for each group of detectors based on the previously modified confirmation count signal per time block for each group of flux detectors; and d) a suppression signal means for issuing an oscillation suppression signal when said simulated decay ratio signal in any group reaches a predetermined level.

* * * * *